(12) United States Patent
Kawasaki et al.

(10) Patent No.: US 6,965,566 B2
(45) Date of Patent: Nov. 15, 2005

(54) PACKET FLOW CONTROL APPARATUS AND A METHOD FOR CONTROLLING THE SAME

(75) Inventors: Takeshi Kawasaki, Kawasaki (JP); Toshio Soumiya, Kawasaki (JP); Koji Nakamichi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 913 days.

(21) Appl. No.: 09/777,340

(22) Filed: Feb. 6, 2001

(65) Prior Publication Data

US 2001/0014081 A1    Aug. 16, 2001

(30) Foreign Application Priority Data

Feb. 16, 2000   (JP)   ............................. 2000-037937

(51) Int. Cl.[7] ........................ G01R 31/08; H04L 12/28; H04J 3/24
(52) U.S. Cl. ...................... 370/235; 370/412; 370/473; 370/389
(58) Field of Search ................................ 370/389, 410, 370/412, 395, 236, 473, 229–235, 235.1, 370/392, 395.1, 395.21, 395.52, 395.4, 395.42, 370/413, 428, 468; 709/223, 238

(56) References Cited

U.S. PATENT DOCUMENTS

| | | | |
|---|---|---|---|
| 5,640,389 A | * | 6/1997 | Masaki et al. ............... 370/418 |
| 5,793,747 A | | 8/1998 | Kline |
| 5,818,818 A | | 10/1998 | Soumiya et al. |
| 6,031,820 A | | 2/2000 | Kawasaki et al. |
| 6,081,505 A | * | 6/2000 | Kilkki ......................... 370/230 |
| 6,205,151 B1 | * | 3/2001 | Quay et al. .................. 370/416 |
| 6,512,741 B1 | * | 1/2003 | Kohzuki et al. .......... 370/230.1 |
| 6,560,230 B1 | * | 5/2003 | Li et al. ................. 370/395.42 |
| 6,570,890 B1 | * | 5/2003 | Keenan et al. .............. 370/493 |
| 6,643,260 B1 | * | 11/2003 | Kloth et al. ................. 370/235 |
| 6,657,954 B1 | * | 12/2003 | Bird et al. ................... 370/229 |

FOREIGN PATENT DOCUMENTS

| | | |
|---|---|---|
| EP | 0 971 511 | 1/2000 |
| JP | 05014388 | 1/1993 |
| JP | 06276207 | 9/1994 |
| JP | 07327033 | 12/1995 |
| JP | 9093256 | 4/1997 |
| JP | 09214499 | 8/1997 |
| JP | 11-313110 | 11/1999 |
| WO | 95/12265 | 5/1995 |

* cited by examiner

*Primary Examiner*—Hanh Nguyen
(74) *Attorney, Agent, or Firm*—Katten Muchin Rosenman LLP

(57) ABSTRACT

A packet flow control apparatus performing flow control of packets each having variable length, includes: a buffer memory for temporarily accumulating arrived packets until a sending time of each packet; a counter updated based on a rate determined in accordance with a packet length calculated by a counter value of the counter and limited flow of packets; a sending time determining section for determining the sending time of each packet based on the counter value and a present time; and a sending order control section for managing a sending order of each packet accumulated in the buffer memory, and for sending a read instruction of each packet to the buffer memory, based on the sending time determined by the sending time determining section.

15 Claims, 22 Drawing Sheets

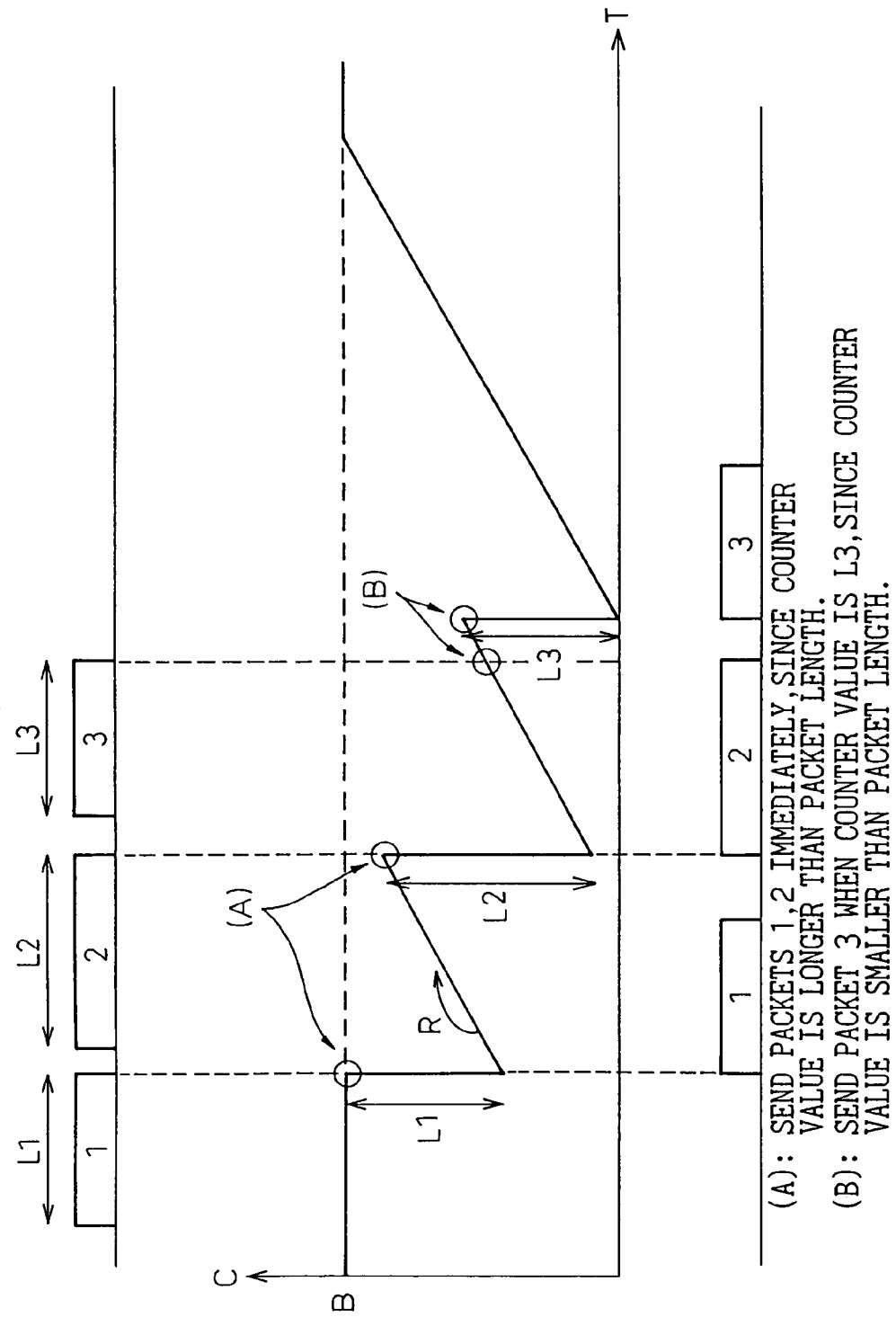

PACKET FLOW CONTROL APPARATUS AND A METHOD FOR CONTROLLING THE SAME

BACKGROUND OF THE INVENTION

1. Field of the Invention

The present invention relates to a packet flow control apparatus and a method for controlling the flow of packets on a network such as the Internet.

2. Description of the Related Art

Recently, in communication systems using variable length packets such as the Internet, provision of a so-called "quality-guarantee type service", which assures the quality so as to avoid a delay at an end-to-end connection or a communication band to be always occupied, has been examined by IETF (Internet Engineering Task Force) and the like.

In the above-mentioned quality-guarantee type service, the information including a flow of sending packets, etc., is previously provided in accordance with a control unit formed of each packet flow, collection of packet flow, a destination of packet, etc., in the network of a user side or a sending side. Further, various resources provided within the network are previously reserved for the above user in a receiving side in accordance with the above information from the sending side.

In this case, however, if a packet, which does not comply with the above information, is sent from the user side or sending side, the resources provided within the network are unexpectedly congested (i.e., the resources becomes busy) so that the transferring quality from the sending side to the receiving side may be worse because of congestion of the network. Accordingly, when the congestion occurs in the network, it is necessary to control packet flow so as to be included in a range which was previously reserved in the user side or sending side network. In a conventional art, a token bucket algorithm is used as a sending control function of an IP (internet protocol) packet in IETF service, in order to realize the above control of the packet flow.

SUMMARY OF THE INVENTION

The object of the present invention is to provide an improved packet flow control apparatus and a method of the same, used in a network, such as an internet, in which the packet flow control can be realized for each control unit by using a small amount of hardware.

In accordance with the present invention, there is provided an improved packet flow control apparatus performing flow control of packets each having variable length, including: a buffer memory for temporarily, accumulating arrived packets until the sending time for each packet; a counter updated based on a rate determined in accordance with a packet length calculated by a counter value of the counter and limited flow of packets; a sending time determining section for determining the sending time of each packet based on the counter value and a present time; and a sending order control section for managing a sending order of each packet accumulated in the buffer memory, and for sending a read instruction of each packet to the buffer memory, based on the sending time determined by the sending time determining section.

As one aspect of the invention, the sending time determining section includes a memory for storing parameters which can determine a state of change of the counter value of the counter for each control unit to independently control the packet flow; when an input packet is written into the buffer memory, the sending time determining section obtains the sending time of the input packet based on the parameter having the same control unit as the input packet read out from the memory; and the sending time determining section updates the parameters having the same control unit in the memory based on a newly obtained sending time of the input packet, and transfers the newly obtained sending time of the input packet to the sending order control section.

As another aspect of the invention, the sending time determining section includes the memory storing parameters which can determine a state of change of the counter value of the counter for each control unit to independently control the packet flow; when an input packet is written into the buffer memory, the sending time determining section obtains the sending time of the input packet based on the parameter having the same control unit as the input packet read out from the memory; and the sending time determining section updates the parameters having the same control unit in the memory based on a newly obtained sending time of the input packet, and transfers the newly obtained sending time of the input packet to the sending order control section.

As still another aspect of the invention, the sending time determining section includes the memory storing parameters for each control unit to independently control the packet flow, which include a recovery time to return the counter value at the sending time of a pre-packet belonging to the control unit to a limit value; when an input packet is written into the buffer memory, the sending time determining section obtains the sending time of the input packet and the recovery time to return the counter value at the sending time to the limit value, based on the parameters read out from the memory; and the sending time determining section updates the parameters having the same control unit in the memory based on a newly obtained recovery time of the input packet, and transfers the newly obtained recovery time of the input packet to the sending order control section.

As still another aspect of the invention, the sending time determining section includes the memory storing parameters which can determine a state of change of the counter value of the counter for each control unit to independently control the packet flow; when a packet to be sent is read out from the buffer memory, the sending time determining section obtains the sending time of a next packet to be sent after the next time within packets belonging to the control unit of the sending packets in the buffer memory, based on the parameter having the same control unit as the sending packet read out from the memory; and the sending time determining section updates the parameters having the same control unit in the memory based on a newly obtained sending time of a next packet, and transfers the newly obtained sending time of the next packet to the sending order control section.

As still another aspect of the invention, the sending time determining section includes the memory storing parameters for each control unit to independently control the packet flow, which include a sending time of a packet belonging to the control unit and a counter value at the sending time; when a packet to be sent is read out from the buffer memory, the sending time determining section obtains the sending time of a next packet to be sent after next time within packets belonging to the control unit of the sending packets in the buffer memory and a counter value at the sending time, based on the parameter having the same control unit as the sending packet read out from the memory; and the sending time determining section updates the parameters having the same control unit in the memory based on a newly obtained sending time of a next packet and the counter value at the sending time, and transfers the newly obtained sending time of the next packet to the sending order control section.

As still another aspect of the invention, the sending time determining section includes the memory storing parameters for each control unit to independently control the packet flow, which include a recovery time to return the counter value at the sending time of a packet belonging to the control unit to a limit value; when a packet to be sent is read out from the buffer memory, the sending time determining section obtains the sending time of a next packet to be sent after next time within packets belonging to the control unit of the sending packets in the buffer memory and the recovery time to return a limit value to a counter value at the sending time, based on the parameter having the same control unit as the sending packet read out from the memory; and the sending time determining section updates the parameters having the same control unit in the memory based on a newly obtained recovery time of a next packet, and transfers the newly obtained recovery time of the next packet to the sending order control section.

BRIEF DESCRIPTION OF THE DRAWINGS

In the drawings:

FIG. 23 is a timing chart for explaining a counter operation at a read control by a token bucket in a conventional art.

DESCRIPTION OF THE PREFERRED EMBODIMENTS

Figure 1:
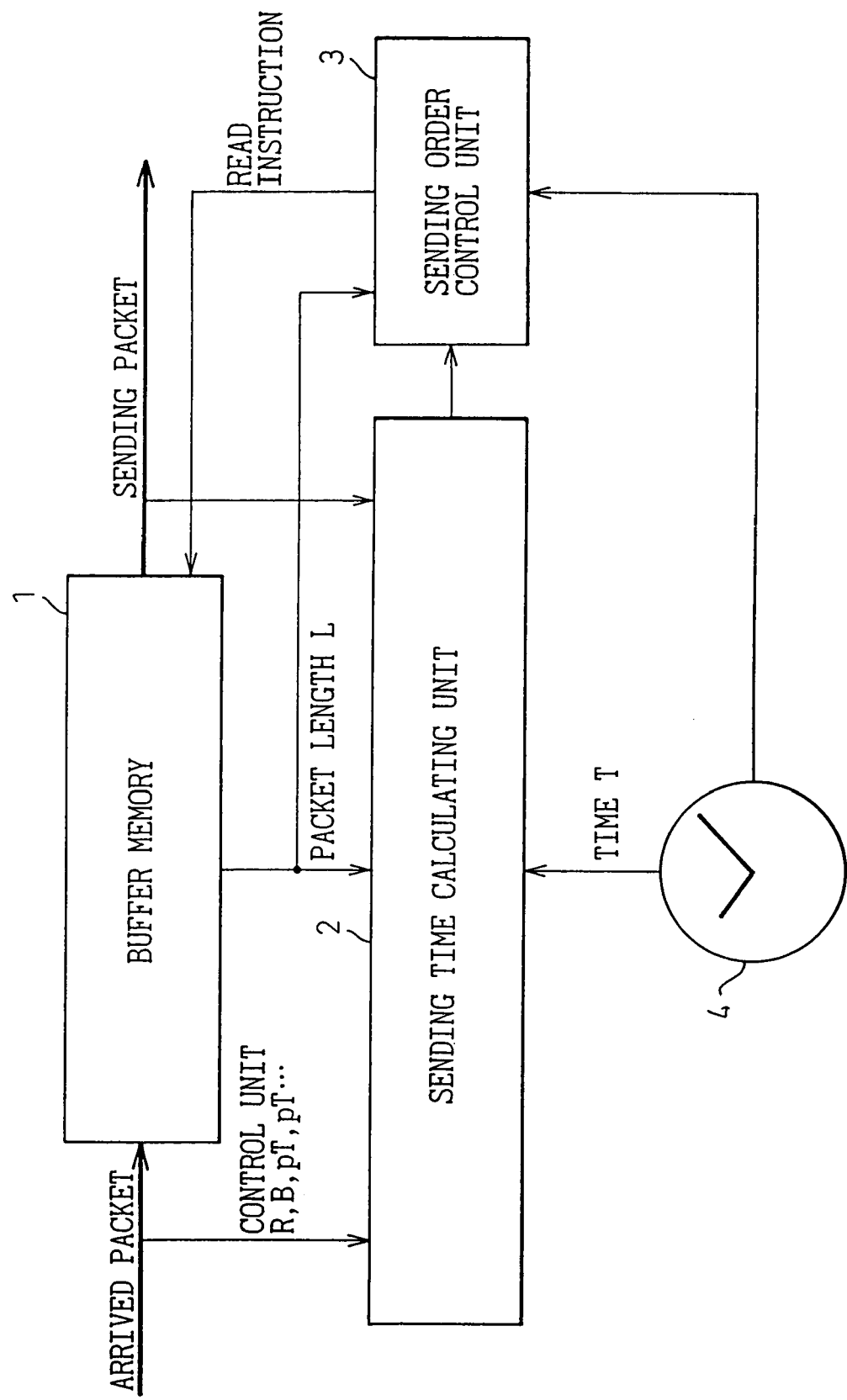
FIG. 1 is a schematic block diagram of a packet flow control apparatus according to an embodiment of the present invention.

Before describing the preferred embodiments of the present invention, a conventional art and its problem will be explained with reference to FIG. 23 below.

FIG. 23 is a timing chart for explaining a counter operation at a read control by a token bucket in a conventional art. This timing chart shows a conventional concept of a flow control function using the token bucket for the variable length packet.

In this flow control function, arrived data packets (below, arrived packets) are sequentially accumulated in a buffer memory used as the sending control. When a sending time of the packet, which is previously determined based on a limited flow R, is passed, the packet is sent from the buffer memory to the network so that it is possible to control packet flow.

In this case, the sending time of the packet to the network is managed by using a token bucket counter. That is, a counter value C (byte) of the token bucket counter is used as an aimed value in order to permit the sending of the packet (a sending permission). In this case, the counter value C is increased up to an upper limit value (i.e. maximum value) B, which is defined as the value that can continuously send the information, in accordance with the limited flow R (byte/sec). In this case, if there are packets in the buffer memory used as the sending control, the bucket counter value C is compared with the packet length L. When the bucket counter value C is larger than the packet length L, it is possible to send the packet by limiting the packet flow less than the limited flow R. Accordingly, the corresponding packet is sent to the receiving side, and the bucket counter value C is subtracted by the packet length L.

On the other hand, when the bucket counter value C is smaller than the packet length L, the packet flow may exceed the limited flow R if the packet is sent to the receiving side at this timing. In this case, the packets are accumulated in the buffer memory until the bucket counter value C is equal to or larger than the packet length L. Then, when the bucket counter value C reaches the packet length L, the corresponding packet is read out from the buffer memory and sent to the receiving side.

Concretely, as shown in FIG. 23, packets 1 to 3 are sequentially sent and accumulated in the buffer memory. It is assumed that each packet length of the packets 1 to 3 is defined as L1, L2 and L3. At the time when the arrived packet 1 is written into the buffer memory, the bucket counter value C indicates the upper value B (the maximum value), and it can be represented by B>L1 so that it is possible to send the packet 1 based on the limited flow R. Accordingly, the packet 1 is read out from the buffer memory and sent to the receiving side, the bucket counter value C is subtracted by the packet length L1 so as to obtain C=B−L1. Further, the bucket counter value C is increased based on the control rate of the flow R in accordance with the elapsed time from the value (B−L1).

When the bucket counter value C is recovered to the packet length L2 of the packet 2 to be sent next, the sending of the packet 2 can be controlled based on the limited flow R. Accordingly, at the time when the sending of the packet 2 reaches possible state after recovered time (in this example, this time is defined by the time when the arrived packet 2 is fully written into the buffer memory), the packet 2 is read out from the buffer memory and sent to the receiving side.

On the other hand, in this example, since the bucket counter value C is subtracted by the packet length L2 at the time when the packet 2 is sent, the bucket counter value C is not recovered to the packet length L3 at the time when the packet 3 has arrived (at the time when the arrived packet 3 is fully written into the buffer memory). In this case, if the packet 3 is sent at that timing, the packet flow exceeds the limited flow R. Accordingly, the sending of the packet 3 is waited until the bucket counter value C is recovered to the packet length L3 or more, and at the recovered time, the packet 3 is read out from the buffer memory and sent to the receiving side.

As a result, even if the packets arrive constantly, it is possible to control the packet flow to be sent based on the limited flow R.

In the above conventional art, however, it is necessary to provide the token bucket counter for each control unit to which the packet belongs. Accordingly, there is a problem that, when there are many control units, it is also necessary to provide many token bucket counters in accordance with the number of control units, so that it is necessary to provide much hardware in accordance with the number of the token bucket counters.

Therefore, the present invention aims to realize improved packet flow control for each control unit by using a reduced amount of hardware.

FIG. 1 is a block diagram of a packet flow control apparatus according to an embodiment of the present invention. In FIG. 1, reference number 1 is a buffer memory for accumulating arrived packets up to the corresponding sending time of each packet. In this case, the arrived packets are sequentially accumulated into the buffer memory 1. When the sending time sT, which is calculated for each arrived packet, has passed, the corresponding packet is read out from the buffer memory, and the read out packet is sent to the network.

Reference number 2 is a sending time calculating unit, which holds parameters related to each packet belonging to the control unit, for each control unit of the arrived packet, and calculates the sending time sT of the packet for each control unit based on the parameter.

Reference number 3 is a sending order control unit, which manages the sending order of the packets accumulated in the buffer memory 1, and instructs sending of each packet to the buffer memory 1 in accordance with the sending order. That is, the sending order control unit 3 determines the packet to be sent or the control unit, based on the information including the sending time sT of each packet and the control unit thereof. Further, the sending order control unit 3 instructs read out and sending of the packet, which the sending time sT was passed, from the packets accumulated in the buffer memory 1.

Reference number 4 is a clock, which indicates the present time T (sec) and sends it to the sending time calculating unit 2 and the sending order control unit 3.

Figure 3:
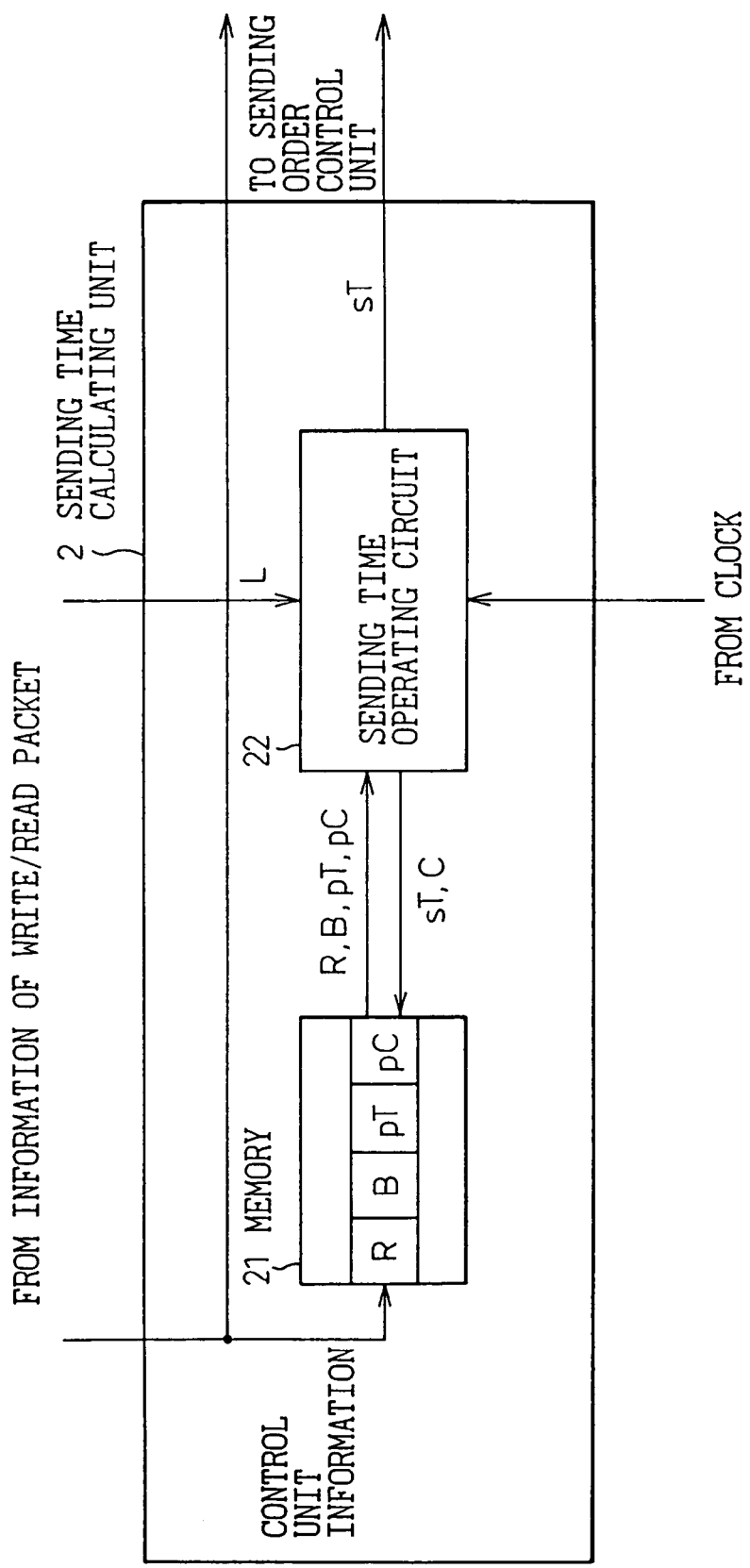
FIG. 3 is a block diagram of a sending time calculating unit in the first (or third) embodiment of the present invention.

FIG. 3 is a detailed block diagram of the sending time calculating unit 2 in FIG. 1. As shown in FIG. 3, the sending time calculating unit 2 includes a memory 21 for storing parameter information for each control unit and a sending time operating circuit 22 for operating the sending time sT based on these parameters. In this case, as the parameter information for each control unit, there are two main parameters, i.e., the information obtained from the arrived packets and the information sequentially calculated by the sending time calculating unit 2. The information obtained from arrived packets includes a sending rate R (byte/sec) indicating the limited flow for each control unit and a token bucket size B (byte). The information sequentially counted by the sending time calculating unit 2 inlcudes a pre-packet sending time pT (sec) and a token bucket counter value pC (byte) at the sending of the pre-packet. These parameters are stored in the memory 21.

The sending time operating circuit 22 determines the control unit of the packet, based on header information, etc., for the packet when writing the arrived packet into the buffer memory 1, and reads out the parameter related to the control unit from the memory 21. Further, the sending time operating circuit 22 obtains the sending time sT (sec) of the packet and the bucket counter value C at that sending time, based on the parameters and the present time T (sec). Still further, the sending time operating circuit 22 updates the corresponding contents in the memory 21 and sends the sending time sT to the sending order control unit 3, by setting the obtained sending time sT as the pre-packet sending time pT, and by setting the operated bucket counter value C as the token bucket counter value pC at the sending of the pre-packet.

Figure 4:
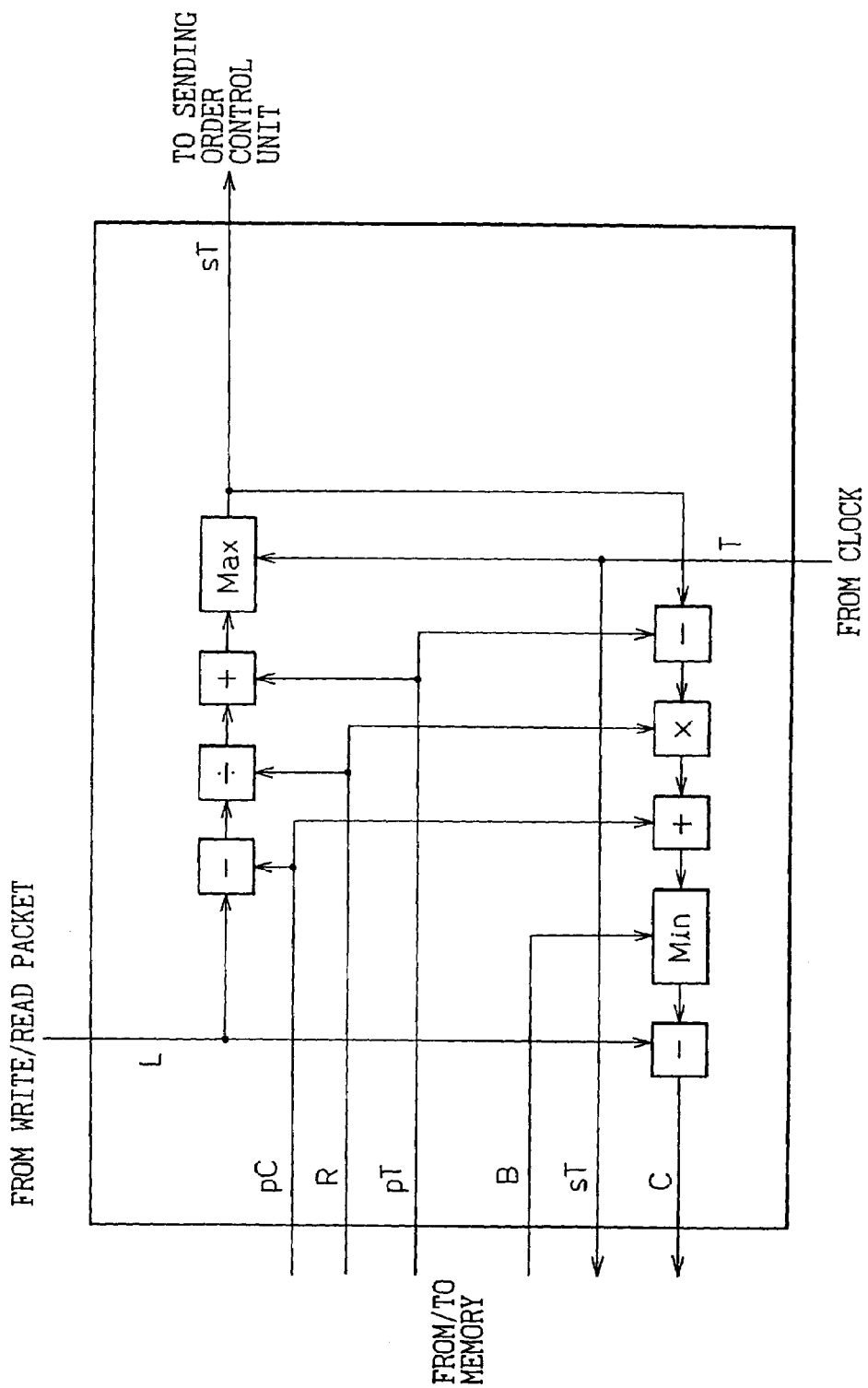
FIG. 4 is a block diagram of a sending time operating circuit in the sending time calculating unit in the first (or third) embodiment of the present invention.

FIG. 4 is a detailed block diagram of the sending time operating circuit 22 in the sending time calculating unit 2. The sending time operating circuit 22 receives the parameters from the memory 21 and the packet length L of the arrived packet from the buffer memory 1. The sending time operating circuit 22 includes hardware for solving the following formula.

$$sT = \mathrm{Max}[pT+(L-pC)/R, T]$$

$$C = \mathrm{Min}[B, pC+(sT-pT) \times R] - L$$

In this case, Max[α, β] represents selecting a larger value of α and β, and Min[α, β] represents selecting a smaller value of α and β. The detailed explanations of this formula will be given below.

Figure 14:
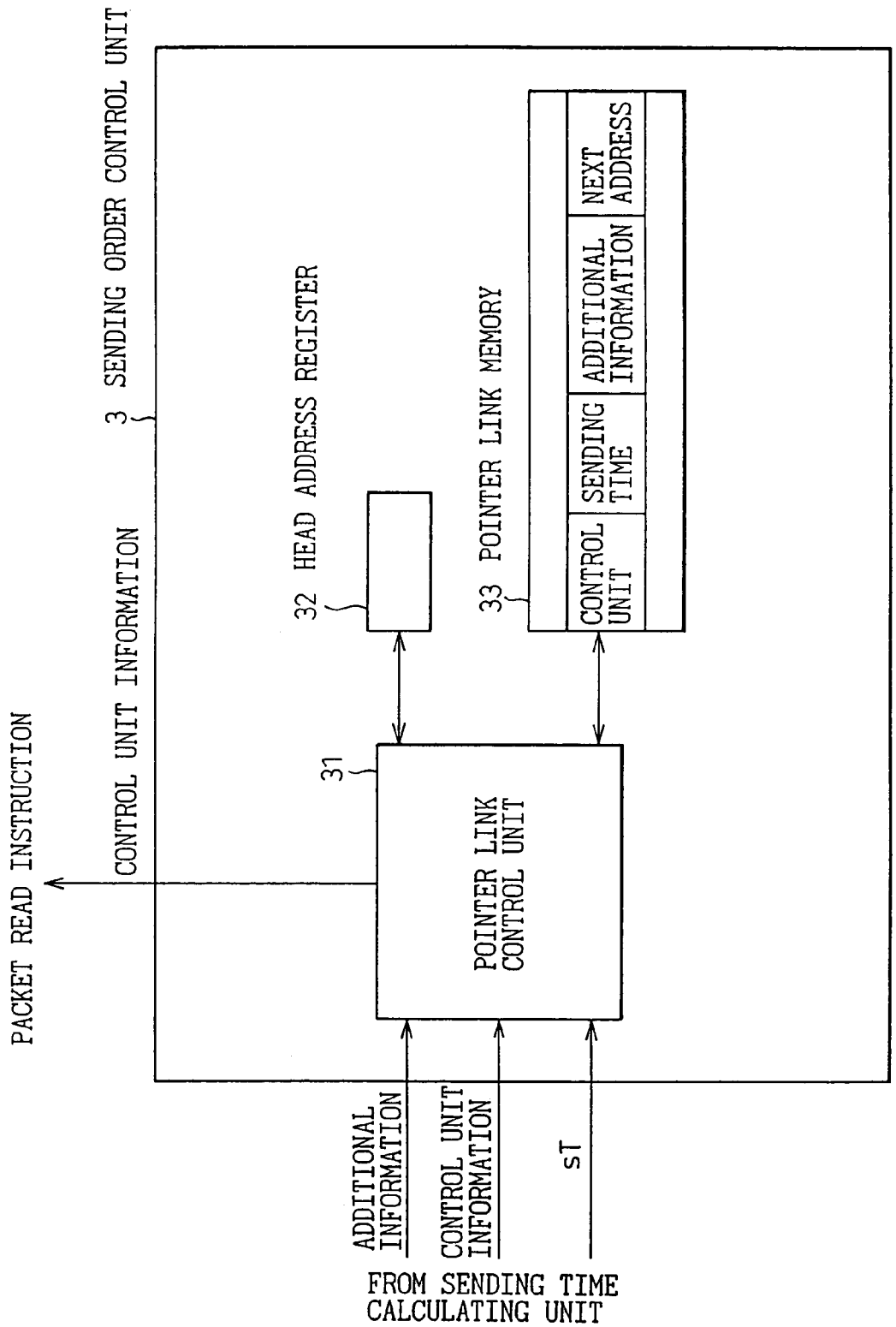
FIG. 14 is a block diagram of a sending order control unit according to an embodiment of the present invention.

FIG. 14 is a detailed block diagram of the sending order control unit 3. As shown in the drawing, the sending order control unit 3 receives the packet information including the sending time sT, the control unit and additional information, from the sending time calculating unit 2. The sending order control unit 3 includes a pointer link control unit 31 for outputting a read out instruction of the packet to be sent to the buffer memory 1, a pointer link memory 33 (or a sending control memory) for accumulating pointer link information, which manages sending order of each packet accumulated in the buffer memory 1, based on the control of the pointer link control unit 31, and a head address register 32 (or a head address memory) for storing head pointers each indicating an address of the head pointer link information which is read out from the pointer link memory 33. In this case, the pointer link information is prepared by the pointer link control unit 31 based on the packet information received from the sending time calculating unit 2, and includes the control unit of each packet, the sending time sT of the packet, the additional information (a priority order of the packet, packet length, etc.,), and the next address which stores the pointer link information of the next packet to be sent at the next time after sending of this packet.

There are various manners in a calculation method of the sending time sT in the sending time calculation unit 2. The following explanations are various embodiments of the calculation method.

[An embodiment (1) for calculation of the sending time]

In the embodiment (1), the sending time sT is calculated when the arrived packets are written into the memory, That is, the sending rate R (byte/sec) and the token bucket size B (byte), and the pre-packet sending time pT (sec) and the token bucket counter value pC (byte) at the sending time of the pre-packet, are stored in the memory 21 of the sending time calculating unit 2 as the parameter of the corresponding control unit.

Figure 2:
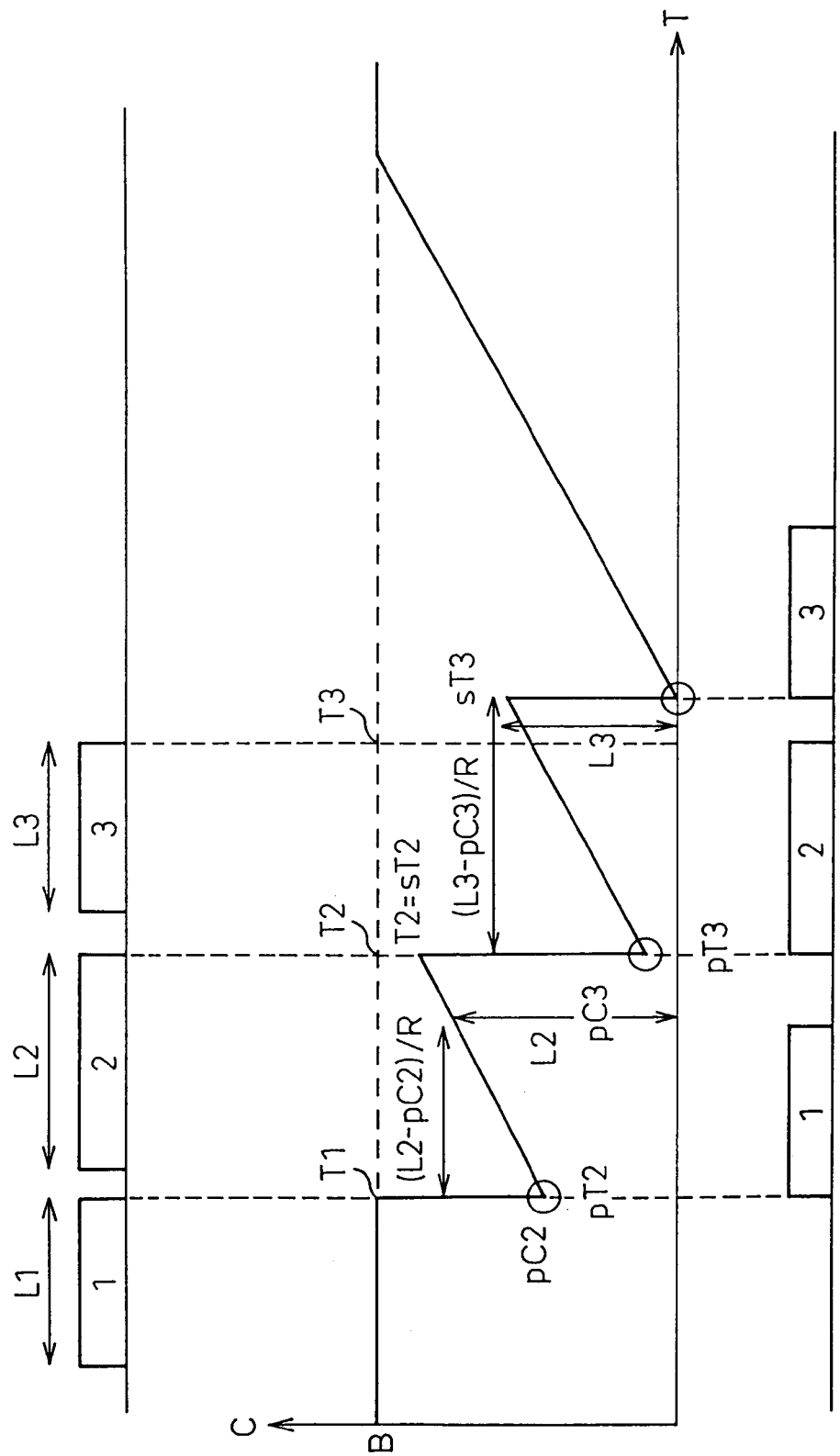
FIG. 2 is a timing chart for explaining the operation of a token bucket counter at sending time calculation in a first (or third) embodiment of the present invention.
Figure 5:
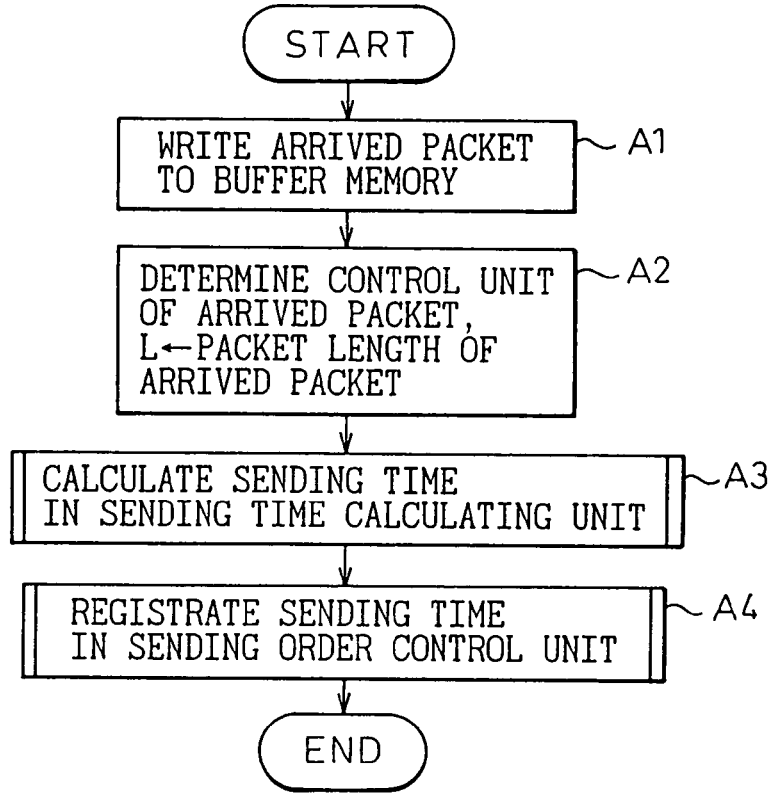
FIG. 5 is a flowchart for explaining a write operation of an arrived packet to a buffer memory in the first (or second) embodiment of the present invention.
Figure 6:
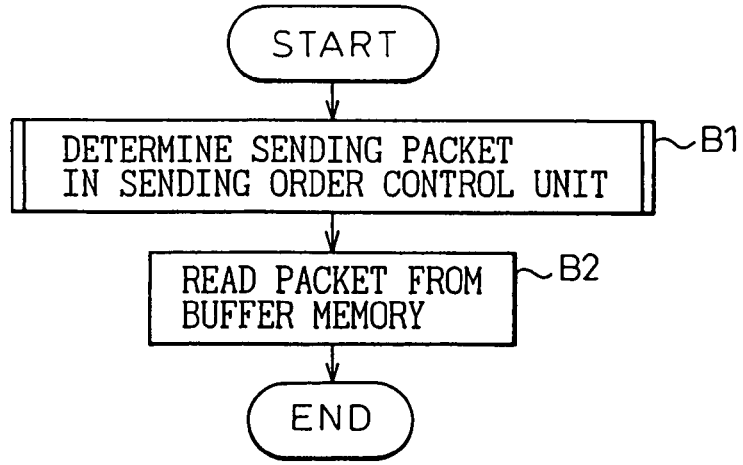
FIG. 6 is a flowchart for explaining a read operation of a sending packet from the buffer memory in the first (or second) embodiment of the present invention.
Figure 7:
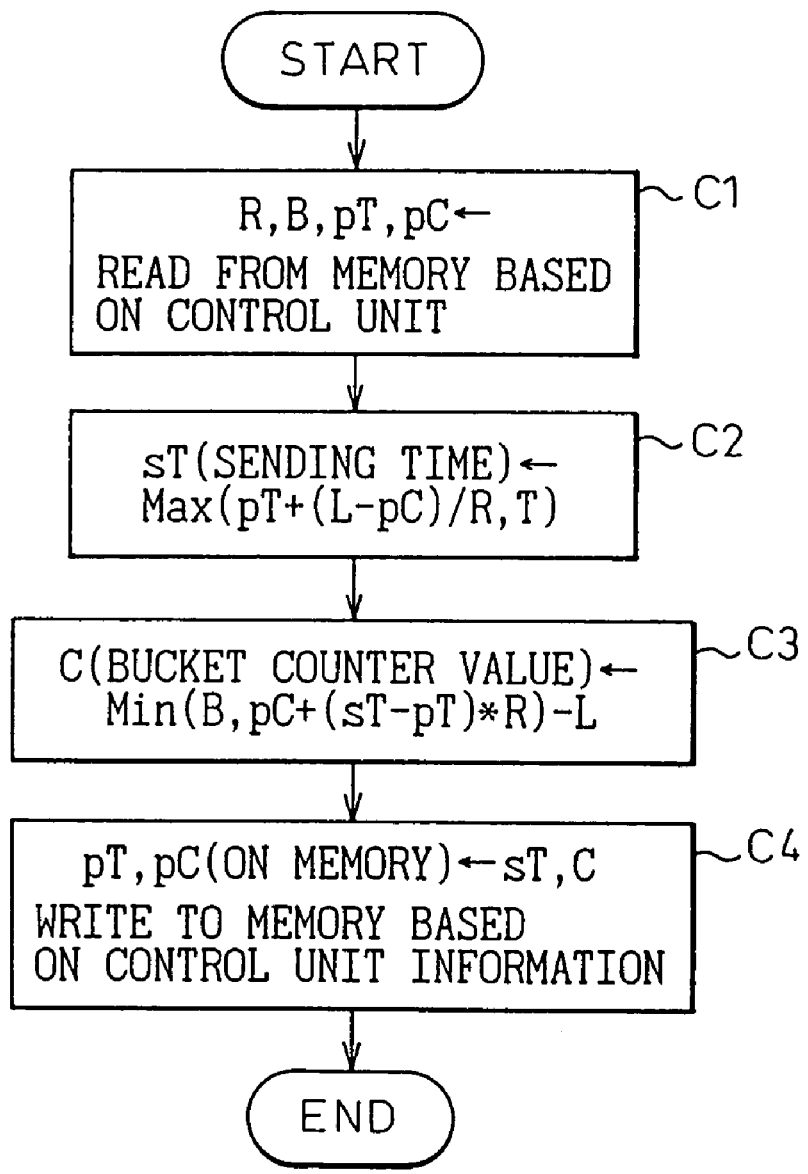
FIG. 7 is a flowchart for explaining the detailed steps of sending time calculating processes in the flowchart shown in FIG. 5 in the first (or third) embodiment of the present invention.

FIG. 2 is a timing chart for explaining the relationship between the operation of the token bucket counter and each internal parameter, in the embodiment (1), FIG. 5 is a flowchart for explaining steps at the write of the arrived packets to the buffer memory 1, FIG. 6 is a flowchart for explaining steps at the read out of the sending packet from the buffer memory 1, and FIG. 7 is a detailed flowchart for explaining steps of sending a time calculation at the write of the arrived packets shown in FIG. 5.

First, the arrived packets are sequentially written into the buffer memory 1 (step A1 in FIG. 5). At the time of writing the arrived packets, the control unit of the arrived packet is determined based on the header information of the arrived packet (step A2). Next, the sending time calculating unit 2 calculates the sending time of each arrived packet based on the parameter of the control unit (step A3).

That is, the parameter corresponding to the control unit is read out from the memory 21 (step C1 in FIG. 7), and the sending time sT (sec) of the arrived packet is obtained based on these parameters and the present time T (sec) of the clock 4. The sending time sT indicates a sending possible time, i.e., a time when the arrived packet accumulated in the buffer memory 1 can be sent in accordance with the limited flow R. This time can be determined by the time when the writing of the arrived packet to the buffer memory 1 is completed, and by the time when the bucket counter value C exceeds the packet length L (byte) of the arrived packet.

That is, a counter permission time eT, which indicates the time when the bucket counter value C becomes the packet length L, can be obtained by obtaining the necessary time until the packet counter value pC becomes the packet length L at the sending time of the pre-packet (i.e., at the timing of read out of the pre-packet) from the limited flow (=an increasing rate) R (byte/sec) of the packet counter, and by adding this time to the sending time pT of the pre-packet. Accordingly, the counter permission time eT can be expressed by the following formula.

$$eT = pT + (L - pC)/R$$

The counter permission time eT is compared with the present time T, and the sending time sT of the packet is determined by the later time (i.e., larger time) between the time eT and the time T. That is, the time sT can be expressed by the following formula (step C2).

$$sT = \text{Max}[pT + (L - pC)/R, T]$$

Further, the bucket counter value C at the sending time sT of the packet can be obtained in such a manner that, first, a time from the sending time pT of the pre-packet until the sending time sT of the present packet is multiplied by the increasing rate R of the bucket counter so that an increased value of the bucket counter value is obtained; next, the increased value is added to the bucket counter value C at the sending time of the pre-packet; an added value is compared with an upper limit value B of the bucket counter; next, a smaller value between the added value and the upper limit value B is selected; finally, the bucket counter value C can be obtained by subtracting the packet length L, which was already sent, from the smaller value. The above steps can be expressed by the following formula (step C3).

$$C = \text{Min}[B, pC + (sT - pT) \times R] - L$$

The parameters stored in the memory 21 are updated based on the sending time sT of the arrived packet and the bucket counter value C at that time. That is, the sending time sT of the arrived packet to be written into the buffer memory 1 is written into the memory 21 as the sending time pT of the pre-packet. Similarly, the bucket counter value C at the sending time sT is written into the memory 21 as the bucket counter value pC at the sending time of the pre-packet (step C4).

Further, the information, such as control unit of the packet written into the buffer memory 1, and the sending time sT calculated for the packet, are sent to the sending order control unit 3 as the packet information. The sending order control unit 3 prepares the pointer link information based on the above packet information, and registers them into the pointer link memory 33 in order of the sending time. The sending order control unit 3 sequentially reads out the pointer link information in order of earlier sending time, determines the contents (step B1), and instructs read out of the corresponding packet to be sent to the buffer memory 1, in accordance with the result of the above determination. The detailed steps in the sending order control unit 3 will be explained below.

FIG. 2 is a timing chart for explaining the relationship between the operation of the counter and each of internal parameters in the embodiment (1). The above-mentioned sending time sT can be calculated as follows. In FIG. 2, the packets 1 to 3 sequentially arrive and accumulate into the buffer memory 1. Each arrived packet 1 to 3 has the corresponding packet length L1 to L3, respectively.

Since the bucket counter value C indicates the upper limit value B (i.e., the maximum value), and can be expressed by B>L1, at the time when the arrived packet 1 was written into the buffer memory 1, it is possible to send the packet 1 based on the control of the limited flow R. Accordingly, the packet 1 is read out from the buffer memory 1 and sent to the receiving side, and the bucket counter value C is subtracted by the packet length L1. As a result, the bucket counter value C can be expressed by the formula C=B−L1, and is increased from the value (B−L1) in accordance with the rate of the flow R (byte/sec).

At the time when the next arrived packet 2 is written into the buffer memory 1, the sending time pT2 of the pre-packet as the time when the pre-packet 1 was sent, and the bucket counter value pC2 at the sending time of the pre-packet as the bucket counter value C, are stored in the memory 21.

The counter permission time eT2 indicates the time when the bucket counter value C reaches the packet length L2 that indicates permission of sending of the packet 2. The counter permission time eT2 can be obtained in such a manner that, first, a time when the bucket counter value pC2 at the sending time pT2 of the pre-packet reaches the packet length L2 is obtained by the increasing rate R (byte/sec) of the bucket counter, and this time is added to the sending time pT2 of the pre-packet. That is, the counter permission time eT2 can be expressed by the following formula.

$$eT2 = pT2 + (L2-pC2)/R$$

The counter permission time eT2 is compared with the present time T, and the later time (i.e., larger time) between the time eT2 and the time T is defined as the sending time sT2 of the corresponding packet. The counter permission time eT2 can be expressed by the following formula.

$$sT2 = \text{Max}[pT2+(L2-pC2)/R, T]$$

In the example shown in FIG. 2, the corresponding packet 2 cannot be sent up to the completion time T2 when the arrived packet 2 is written into the buffer memory 1. Since the time T2 is larger than the time eT2 that was obtained by calculation, the sending time sT2 becomes the time T2. That is, when the sending time sT2 is the time T2, the packet 2 is read out from the buffer memory 1.

The bucket counter value C at the sending time sT2 of the packet 2 can be obtained in such a manner that, first, a time from the sending time pT2 of the pre-packet until the sending time sT2 of the present packet is multiplied by the increasing rate R of the bucket counter so that an increased value [=(sT2−pT2)×R] of the bucket counter value is obtained; next, the increased value is added to the bucket counter value C (=pC) at the sending time of the pre-packet; an added value is compared with an upper limit value B of the bucket counter; next, a smaller value between the added value and the upper limit value B is selected; finally, the bucket counter value C can be obtained by subtracting the packet length L2, which was already sent, from the smaller value. The above steps can be expressed by the following formula.

$$C = \text{Min}[B, pC2+(sT2-pT2)\times R]-L2$$

The sending time sT2 obtained by the above calculation is defined as the sending time sT3 of the pre-packet for the next packet 3, and the bucket counter C is defined as the bucket counter value pC3 at the sending of the pre-packet for the next packet 3.

Further, at the time when the arrived packet 3 is written into the buffer memory 1, the counter permission time eT3 indicates the time when the bucket counter value C reaches the packet length L3 that indicates permission of sending of the packet 3. The counter permission time eT3 can be obtained in such a manner that, first, a time when the bucket counter value pC3 at the sending time pT3 of the pre-packet reaches the packet length L3 is obtained by the increasing rate R (byte/sec) of the bucket counter, and this time is added to the sending time pT3 of the pre-packet. That is, the counter permission time eT3 can be expressed by the following formula.

$$eT3 = pT3+(L3-pC3)/R$$

The counter permission time eT3 is compared with the present time T, and the later time (i.e., larger time) between the time eT3 and the time T is defined as the sending time sT3 of the corresponding packet. The counter permission time eT3 can be expressed by the following formula.

$$sT3 = \text{Max}[pT3+(L3-pC3)/R, T]$$

In this case, the packet 3 cannot be sent up to the completion time T3 when the packet 3 is written into the buffer memory 1. Since the bucket counter value C is not recovered to the packet length L3 at this time T3, the sending of the packet 3 is not permitted. That is, the above-calculated counter permission time eT3 is used as the sending time sT3 of the packet 3, and the packet 3 is read out from the buffer memory 1 and sent to the receiving side at the time when the present time T reaches the sending time sT3 (=eT3).

Further, the bucket counter value C at the sending time sT3 of the packet 3 can be obtained in such a manner that, first, a time from the sending time pT3 of the pre-packet until the sending time sT3 of the present packet is multiplied by the increasing rate R of the bucket counter so that an increased value [=(sT3−pT3)×R] of the bucket counter value is obtained; next, the increased value is added to the bucket counter value C (=pC3) at the sending time of the pre-packet; an added value is compared with an upper limit value B of the bucket counter; next, a smaller value between the added value and the upper limit value B is selected; finally, the bucket counter value C can be obtained by subtracting the packet length L3, which was already sent, from the smaller value. The above steps can be expressed by the following formula.

$$C = \text{Min}[B, pC3+(sT3-pT3)\times R]-L3$$

[An embodiment (2) for calculation of the sending time ]

In the embodiment (2), the sending time sT is calculated at the time when the arrived packets are written into the memory. FIGS. 8 to 11 are provided for explaining the embodiment (2). In the embodiment (2), the parameters used for calculating the sending time sT are changed from the embodiment (1), and the number of parameters stored in the memory 21 is reduced, so that the capacity required for the memory can be reduced.

Figure 8:
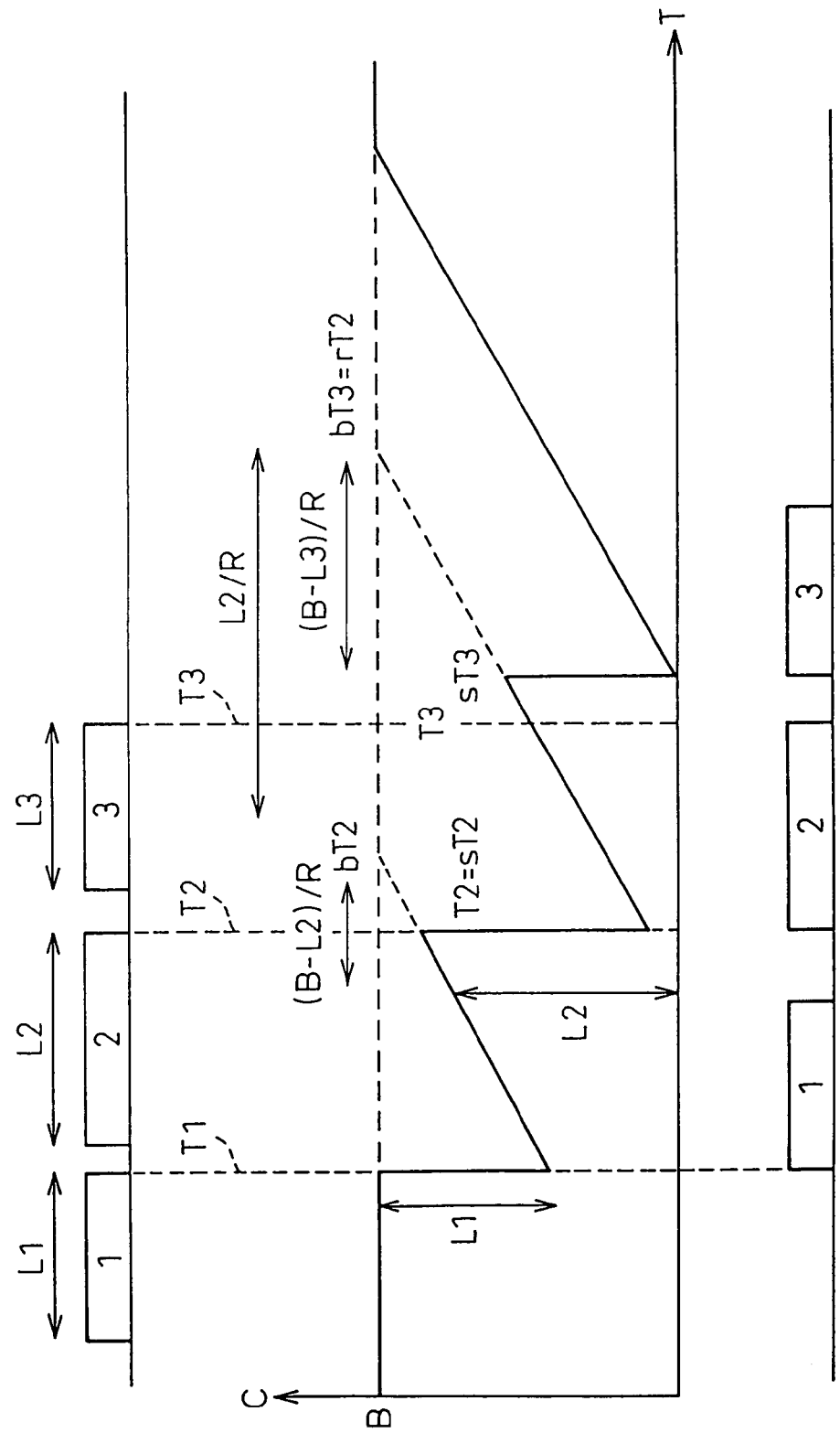
FIG. 8 is a timing chart for explaining an operation of a token bucket counter at sending time calculation in a second (or fourth) embodiment of the present invention.

That is, in the embodiment (2), the memory 21 in the sending time calculating unit 2 stores, for each control unit of the arrived packet, the sending rate R (byte/sec) and the token bucket size B (byte), and the time bT (below, this time is called a recovery time to the upper limit value of the pre-packet) when the token bucket counter value C at the sending time of the pre-packet returns to the upper limit value B (=initial value), as the parameters of that control unit. FIG. 8 is a timing chart for explaining the relationship between the operation of the token bucket counter and each of internal parameters, in the embodiment (2).

Figure 9:
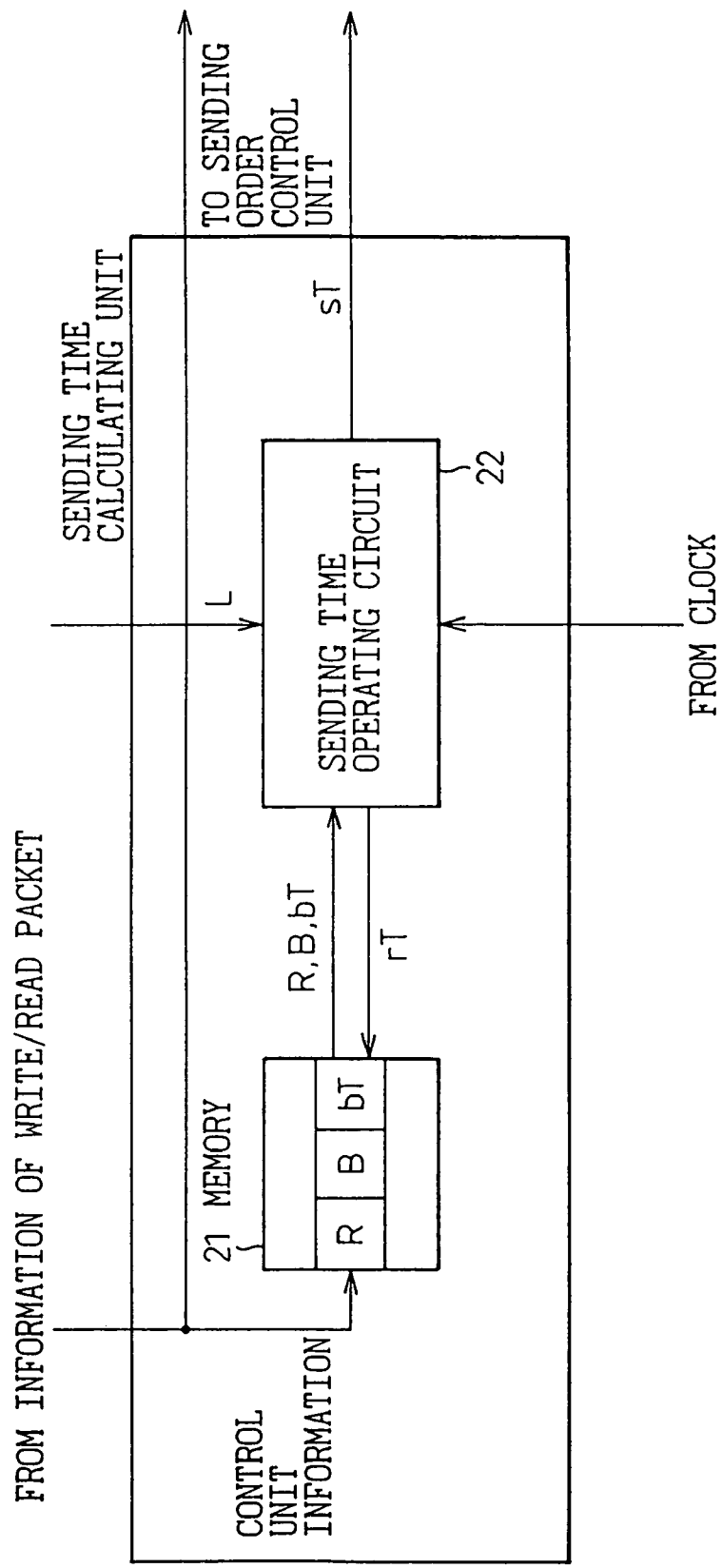
FIG. 9 is a block diagram of a sending time calculating unit in the second (or fourth) embodiment of the present invention.
Figure 10:
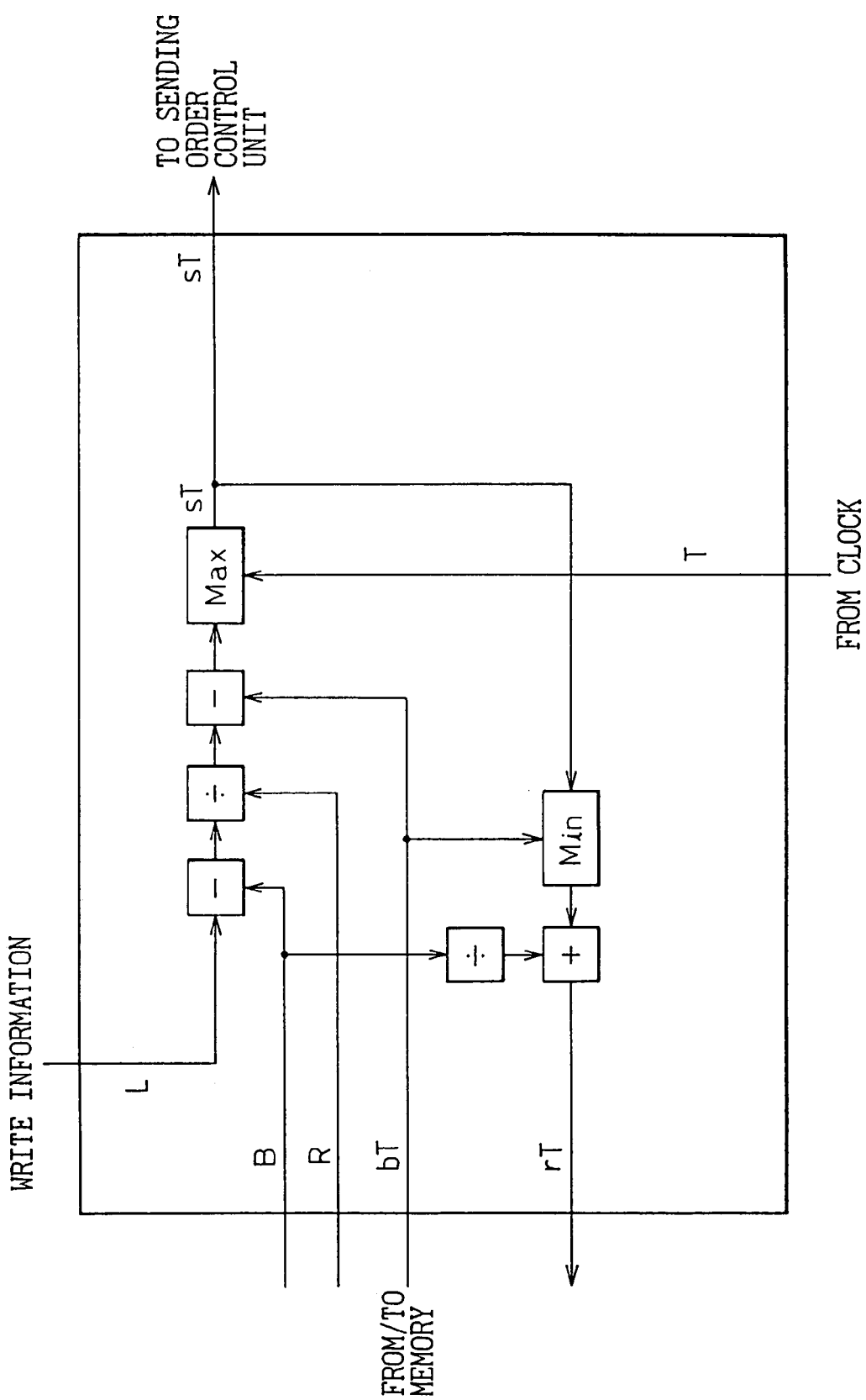
FIG. 10 is a block diagram of a sending time operating circuit in the sending time calculating unit in the second (or fourth) embodiment of the present invention.

FIG. 9 is a detailed block diagram of the sending time calculating unit 2 in the embodiment (2). The basic structure is the same as the embodiment (1) (see FIG. 3) as structured by the memory 21 and the sending time calculating unit 2. In the embodiment (2), the memory 21 stores the sending rate R (byte/sec) for each control unit and the token bucket size B (byte), as well as the first embodiment. Further, the memory 21 stores the recovery time bT to the upper limit value of the pre-packet indicating the time when the token bucket counter value C at the sending time of the pre-packet returns to the upper limit value B, instead of the sending time pT of the pre-packet and the bucket counter value pC in the first embodiment. Further, the sending time calculating unit 2 is structured by the hardware for solving the following formula.

$$sT = \text{Max}[bT+(b-L)/R, T]$$

$$rT = \text{Max}[sT, bT]+L/R$$

Figure 11:
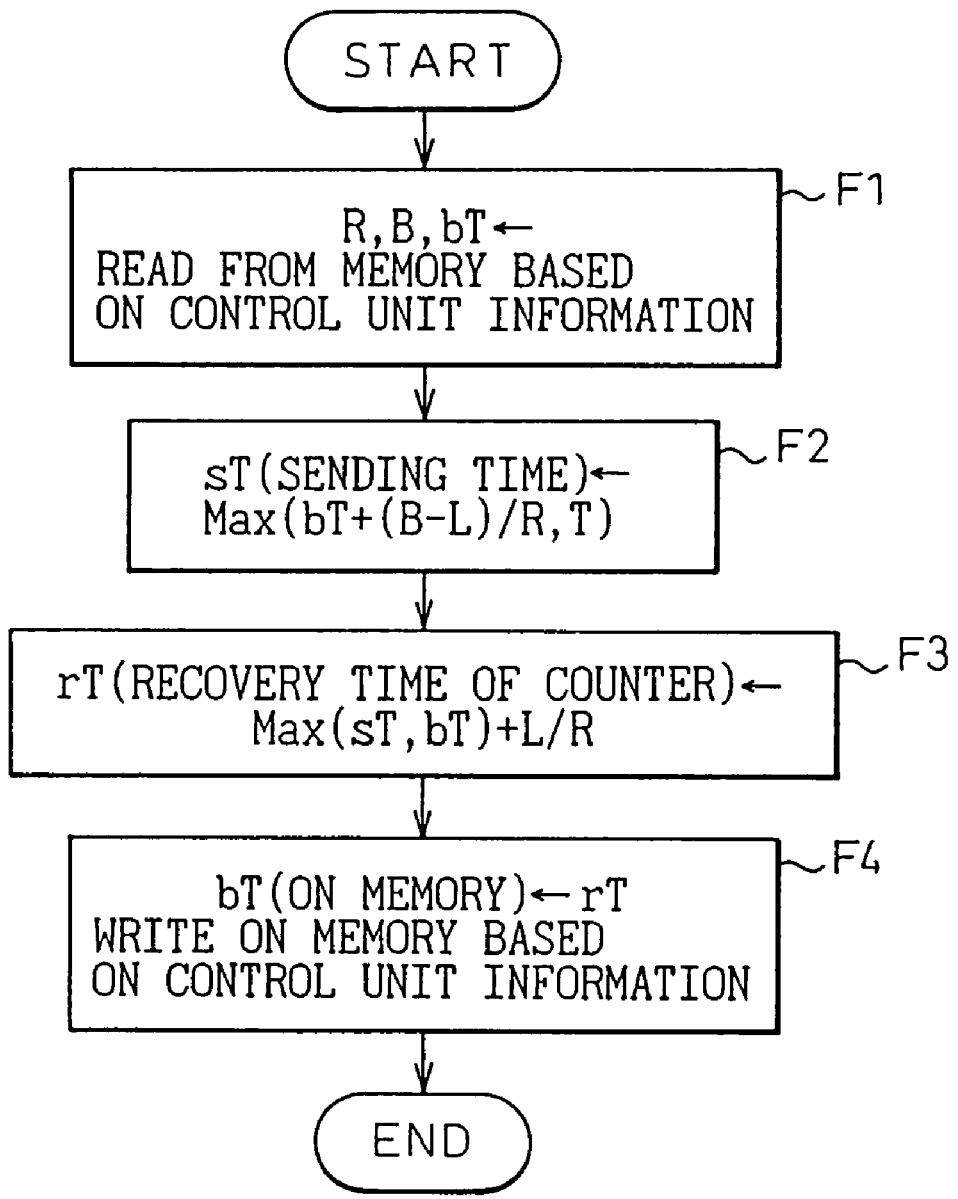
FIG. 11 is a flowchart for explaining the detailed steps of sending time calculating processes in the flowchart shown in FIG. 5 in the second embodiment.

A calculation method of the sending time sT in the sending time calculating unit 2 in the embodiment (2) will be explained in detail below. In this case, although the steps of the write operation to the buffer memory 1 of the arrived packet are the same as the steps shown in FIG. 5 in the embodiment (1), the detailed calculation of the sending time sT is different from the first embodiment, as shown in FIG. 11. Further, the steps of the read operation from the buffer memory 1 are the same as the steps shown in FIG. 6 in the embodiment (1).

As mentioned above, the memory 21 stores, for each control unit of the arrived packet, the sending rate R, the token packet size B and the recovery time bT of the upper limit value of the pre-packet, as parameters.

In FIG. 11, when writing the arrived packet into the buffer memory 1, the control unit of the packet is identified based on the header information of that packet, and the parameter for the identified control unit is read out from the memory (step F1). The sending time sT of the packet can be obtained based on the parameters and the present time T and based on the time when the write of the arrived packet to the buffer memory 1 is completed and the bucket counter value C exceeds the packet length L.

In this case, since the recovery time of the upper limit value, in which bucket counter value C at the sending time of the pre-packet recovers to the upper limit value B, can be expressed by bT, the recovery time until the bucket counter value C reaches the upper limit value B from the packet length L, can be obtained by dividing the difference value (B–L) between the upper limit value B and the packet length L into the increasing rate R of the bucket counter value C. Further, the time when bucket counter value C reaches packet length L (=the counter permission time eT) can be obtained by subtracting the recovery time [=(B–L)/R] from the recovery time bT of the upper limit value of the pre-packet. Further, the counter permission time eT is compared with the present time T, and the later time between the time eT and the time T is selected so that the sending time sT of the packet can be obtained as shown by the following formula (step F2).

$$sT = \text{Max}[bT-(b-L)/R, T]$$

Further, the time rT (this is called the recovery time of the upper limit value of the pre-packet) when the bucket counter value C at the sending time of the present packet returns to the upper limit value B, can be obtained in such a manner that, if the bucket counter value C reaches the upper limit value B at the sending time sT of the present packet (that is, if the sending time sT is larger than the recovery time bT of the upper limit value of the pre-packet), the difference value (B–L) between the upper limit value B and the packet length L is calculated; and the time when the difference value (B–L) is increased based on the increasing rate R and reaches difference zero (i.e., the time returning to the upper limit value B) is added to the sending time sT of the present packet, as shown by the formula sT+L/R.

On the other hand, if the sending time sT of the present packet is smaller than the recovery time bT of the upper limit value of the pre-packet, the recovery time rT of the upper limit value of the present packet can be obtained in such a manner that the time (=L/R) required for returning the bucket counter value based on a value subtracted by the packet length L of the present packet at the sending time sT, is added to the recovery time bT of the upper limit value of the pre-packet, as shown by the formula bT+L/R.

That is, the recovery time rT of the upper limit value of the present packet can be obtained by the following formula in all the above cases (step F3).

$$rT = \text{Max}[sT, pT]+L/R$$

The obtained recovery time rT of the upper limit value of the present packet is stored in the memory 21 as the new recovery time bT of the upper limit value of the pre-packet (step F4).

Further, a newly obtained sending time sT of the present time is transferred to the sending order control unit 3 with the position information of the packet and the control unit information on the buffer memory 1, as the packet information. The packet information are registered in order of the sending time as the pointer link information.

[An embodiment (3) for calculation of the sending time]

In the embodiment (3), the sending time sT is calculated at the time when the arrived packets are read out from the buffer memory. As explained above, in the embodiments (1), (2), the sending time sT of the packet is calculated at the time when that packet is written into the buffer memory 1, and the calculated sending time is registered into the sending order control unit 3 with other packets. In this method, however, it is necessary to provide a memory having a large capacity in order to store all sending times sT for all arrived packets. In order to resolve this problem, the calculation of the sending time sT of the packet is performed at the time when the packet is read out from the buffer memory 1, in the embodiment (3). In this case, when the packet is read out from the buffer memory 1 and sent to the receiving side, the sending time sT of the next packet, which is sent in next order of the present packet, is calculated and registered into the sending order control unit 3. According to the embodiment (3), it is not necessary to provide the memory capacity to store the sending time sT, for all arrived packets. That is, the memory capacity is prepared so as to be sufficient to store only the number of control unit corresponding to the arrived packet.

Figure 12:
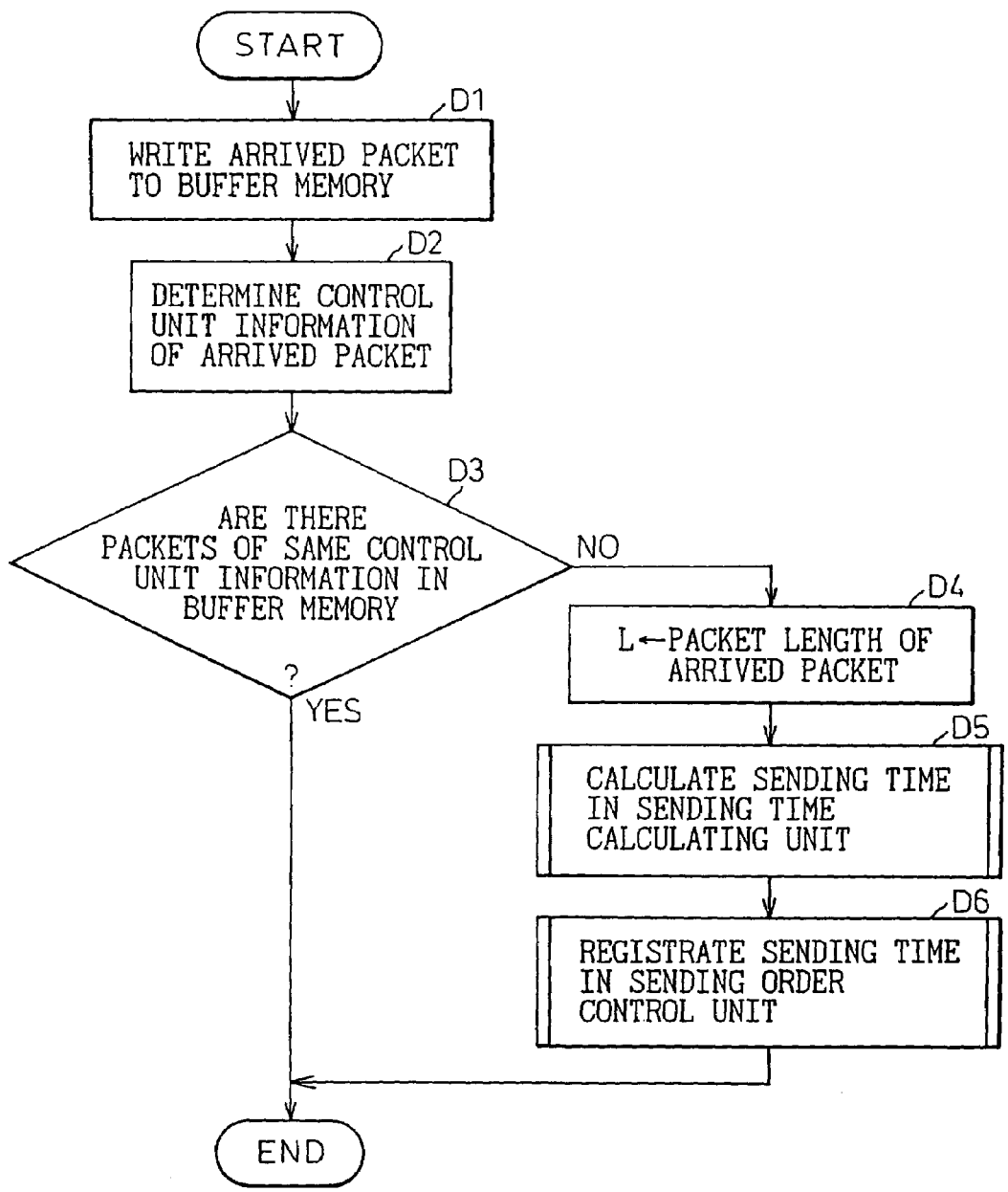
FIG. 12 is a flowchart for explaining a write operation of the arrived packet to the buffer memory in the third (or fourth) embodiment of the present invention.
Figure 13:
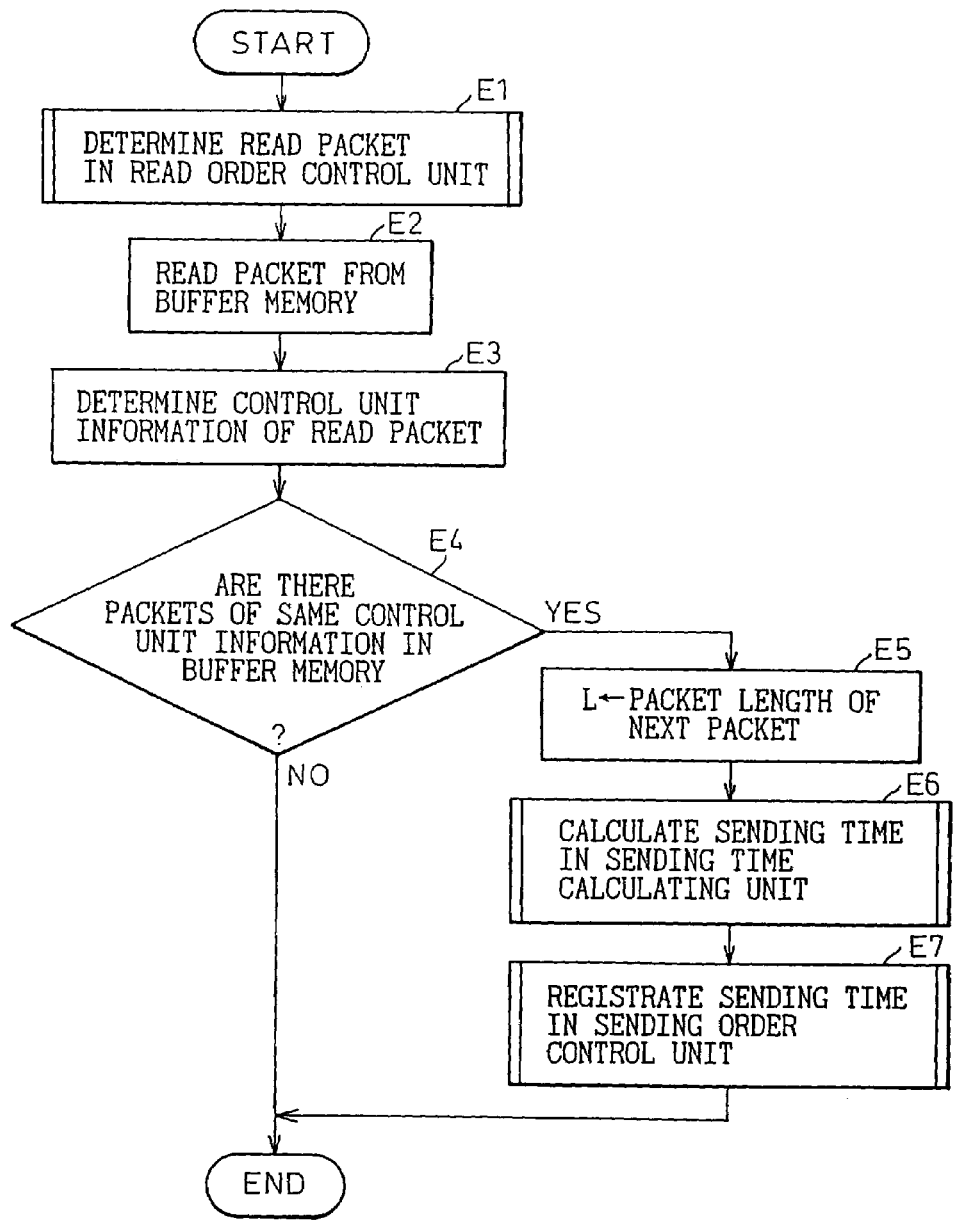
FIG. 13 is a flowchart for explaining a read operation of the sending packet from the buffer memory in the third (or fourth) embodiment of the present invention.

FIG. 12 is a flowchart for explaining a write operation of the arrived packet to the buffer memory 1 in the embodiment (3), and FIG. 13 is a flowchart for explaining a read operation from the buffer memory 1 in the embodiment (3). The detailed calculation method of the sending time sT in the embodiment (3) is basically the same as the calculation method in the embodiment (1), i.e., the calculation method explained in the counter operation of FIG. 8 and in the flowchart of FIG. 11.

First, the operations are briefly explained below. In the embodiment (3), when the packet is arrived to the buffer memory 1, if the packet having the same control unit as the arrived packet has been already stored in the buffer memory 1 (i.e., if a plurality of packets having the same control unit are accumulated in the buffer memory 1), it is possible to calculate the sending time sT of the next packet, since the next packet belonging to the same control unit as the sending packet exists in the buffer memory 1, when the sending packet is read out from the buffer memory 1. On the other hand, if the packet having the same control unit as the arrived packet does not exist in the buffer memory 1, since the sending time sT of the arrived packet cannot be calculated as the sending time sT of the next packet when other packets having the same control unit are read out from the buffer memory 1, the sending time sT of the packet is calculated at the time when the packet is written into the buffer memory 1, and the calculated sending time sT is registered into the sending order control unit 3.

That is, the memory 21 stores the sending rate R and token bucket size B for each control unit, the sending time cT of the present packet indicating the present sending time, and the token bucket counter value cC of the sending time of the present packet. This is different from the embodiment (1) which stores the sending time pT of the pre-packet and the bucket counter value pC at the sending time of the pre-packet.

As shown in FIG. 12 for explaining write operation in the embodiments (3) and (4). First, the arrived packets are sequentially stored into the buffer memory 1 (step D1). When the arrived packet is written into the buffer memory 1, the control unit of the packet is identified based on the header information of the arrived packet (step D2). Further, whether there are the packets belonging to the same control unit in the buffer memory 1 is checked (step D3). If there are the packets belonging to the same control unit in the buffer memory 1, it is not necessary to do any process, and the write process is completed. In this case, the sending time sT of the packet is calculated as the sending time sT of the next packet at the time when the previous packet is read out from the buffer memory 1.

On the other hand, when the there are no packets belonging to the same control unit in the buffer memory 1, it is necessary to calculate the sending time of the arrived packet of this time at the present time (i.e., the time when the packet is written into the buffer memory 1). That is, the parameter corresponding to the control unit of the packet is read out from the memory 21. Further, based on the parameter and the present time T, the sending time sT of the arrived packet can be obtained as the time when the bucket counter value C exceeds the packet length L of the arrived packet.

Further, the bucket counter value C is obtained at the sending time of the packet, and the sending time sT and the bucket counter value C are stored in the memory 21 as the sending time cT of the present packet and the bucket counter value cC at the sending time of the present packet. Further, the sending time sT is sent to the sending order control unit 3 with the information of the packet of the position stored in the buffer memory 1 and control unit.

On the other hand, as shown in FIG. 13, when the packet is read out from the buffer memory 1, the sending order control unit 3 determines the next packet to be sent (step E1), and instructs read-out of the packet to the buffer memory 1. In accordance with the instructions, the packet is read out from the buffer memory 1 (step E2). At the time when the packet is read out, the control unit of the packet is identified (step E3), and whether there are the packets belonging to the same control unit as the read packet are checked (step E4.). When there are no packets, it is not necessary to do any process and the read-out process is completed.

On the other hand, when there are packets belonging to the same control unit, the sending time of the next packet to be read out in the same control unit is calculated based on the following steps.

The following calculation steps are the same as the steps explained in FIG. 7, except that the sending time p of the pre-packet is replaced to the sending time cC of the present packet and the bucket counter value pC at the sending time of the pre-packet is replaced to the bucket counter value cC at the sending time of the present packet.

That is, first, the packet length of the next packet is read out from the buffer memory 1 (step E5). Further, the parameters corresponding to the control unit are read out from the memory 21. The sending time sT of the next packet can be obtained based on the parameters and the present time T as the time when the bucket counter value exceeds the packet length L of the next packet. These steps can be expressed by the following formula.

$$sT = \mathrm{Max}[cT + (L - cC)/R, T]$$

Further, the bucket counter value C at the sending time of the next packet can be obtained by the following formula.

$$C = \mathrm{Min}[B, cC + (sT - cT) \times R] - L$$

Further, the obtained sending time sT of the next packet and the bucket counter value at that time are stored in the memory 21 as the sending time cT of the present packet and the bucket counter value cC at the time. The sending time sT is sent to the sending order control unit 3 with the information of the position of the packet on the buffer memory 1 and the control unit.

[An embodiment (4) for calculation of the sending time]

In the embodiment (4), the sending time sT is calculated at the time when the arrived packets are read out from the buffer memory. As well as the third embodiment, the sending time T is calculated at the time when the packet is read out from the memory 21, and not stored for each packet in the sending order control unit 3 in the embodiment (4). In the calculation method of the sending time, the number of parameters to be stored in the memory 21 can be reduced by performing the same method as the embodiment (2) shown in FIG. 8.

In the embodiment (4), the steps of the write operation of the packet to the buffer memory 1 are the same as the steps of the embodiment (3) shown in FIG. 12, and the steps of the read operation of the packet from the buffer memory 1 are the same as the steps of the embodiment (3) shown in FIG. 13. On the other hand, the detailed steps of the read time calculation in the flowchart shown in FIG. 13 are different from the step of the embodiment (3), and the same as the steps of the embodiment (2). However, "bT" in FIG. 11 is not the recovery time of the upper limit value of the pre-packet, but is the recovery time of the upper limit value of the present packet.

In the embodiment (4), the memory 21 in the sending time calculating unit 2 stores, for each control unit of the arrived packet, the sending rate R (bytes/sec) and the token bucket size B (bytes), and the recovery time bT of the upper limit value of the present packet in which the token bucket counter value C at the sending time of the present packet returns to the upper limit value (=initial value) B, as the parameters of the control unit. When comparing the embodiment (2) with the embodiment (4), as the difference between these embodiments, the former stores the recovery time of the upper limit value of the pre-packet, and the latter stores the recovery time of the upper limit value of the present packet.

When the arrived packet is written into the buffer memory 1, the control unit of the arrived packet is identified based on the information of the header of the arrived packet, and whether there are the packets belonging to the same control unit in the buffer memory 1 is determined. When there are the packets, the calculation of the sending time sT of the arrived packet is performed at the time when a just one before packet is read out so that it is not necessary to do any processes at the write operation in the buffer memory 1.

On the other hand, when there are no packets belonging to the same control unit in the buffer memory 1, the calculation of the sending time sT of the arrived packet must be performed at the write time to the buffer memory 1. In this case, the calculation method is the same as that of the embodiment (1). That is, the parameters corresponding to the control unit are read out from the memory 21. The sending time sT of the present packet can be obtained based on the parameters and the present time T, as the time when the bucket counter value exceeds the packet length L of the arrived packet and when the write operation to the buffer memory 1 is completed.

Furthermore, a time rT, when the token bucket counter value C at the sending time of the packet returns to the upper limit value B, is calculated, and the time rT is stored as the recovery time pT of the upper limit value of the present packet. Further, the sending time sT of the present packet is sent to the sending order control unit 3 with the information of the stored position of the packet on the buffer memory and the information of the control unit.

When the packet is read out from the buffer memory 1, if there are no packets, which belong to the same control unit as the read packet, in the buffer memory 1, the read operation is completed without any processes since there are no packets to be sent at the next order.

On the other hand, if there are packets, which belong to the same control unit as the read packet, in the buffer memory 1, the sending time of the next packet to be read (i.e., next packet) in the packets having the same control unit existing in the buffer memory 1 is calculated as follows.

First, the parameters corresponding to the control unit are read out from the memory 21. The sending time sT of the next packet can be obtained as the time when the counter value exceeds the packet length L of the arrived packet, and when the write operation of the next packet to the buffer memory 1 is completed. The above calculation can be expressed by the following formula.

$$sT=\text{Max}[pT-(B-L)/R, T]$$

Further, the time rT when the bucket counter value C at the sending time of the next packet returns to the upper limit value B, can be expressed by the following formula.

$$rT=\text{Max}(sT, bT)+L/R$$

Further, time rT is stored as the recovery time bT of the upper limit value of the new present packet, and the sending time sT of the next packet calculated by the above formula is sent to the sending order control unit 3 with the information of the stored position of the packet on the buffer memory and the information of the control unit.

[An embodiment (5) for calculation of the sending time]

In the embodiment (5), the sending time sT is calculated at the time when the arrived packets are written into the buffer memory. This embodiment corresponds to the process that each parameter is normalized so as to set the increasing rate (an adding rate) R of the bucket counter value C to a value "1" in the embodiment (1). Accordingly, although the basic portions of this embodiment are the same as the embodiment (1), the following portions are different from the embodiment (1).

That is, the memory 21 stores the reciprocal 1/R of the sending rate (limited flow) R for each control unit, a normalized value B'(=B/R) based on the sending rate R of the token packet size, the sending time pT of the pre-packet, and a normalized value pC'(=pC/R) based on the rate of the token bucket counter value pC at the sending time of the pre-packet.

When the arrived packet is written into the buffer memory 1, the control unit of the arrived packet is identified based on the header information of the arrived packet, the parameter corresponding to the control unit is read out from the memory 21. Based on the parameter and the present time T, the sending time sT of the arrived packet can be calculated as the time when the counter value exceeds the normalized value L/R of the packet length L of the arrived packet, and when the write operation of the arrived packet to the buffer memory is completed, as shown by the following formula.

$$sT=\text{Max}[pT+L/R-pC', T]$$

Further, the bucket counter value C at the sending time sT of the packet can be obtained by the following formula.

$$C'=\text{Min}(B', pC'+sT-pT)-L/R$$

The calculated sending time sT and the bucket counter value C' are stored, in the memory 21, as the sending time pT at the pre-packet and the bucket counter value pC' at the sending time of the pre-packet. Further, the sending time sT is sent to the sending order control unit 3 with the position information of the packet on the buffer memory and the information of the control unit.

In this case, a method for calculating the sending time based on the above normalization in the embodiment (5) can be applied to the calculation of the sending time in the embodiments (1) to (4).

Next, a method for managing the sending order of the packet in the sending order control unit 3, which is performed in order to read the packets in order of the sending time, will be explained in detail below. Various methods are explained in order below.

(An embodiment (a) for managing the sending order)

Figure 15:
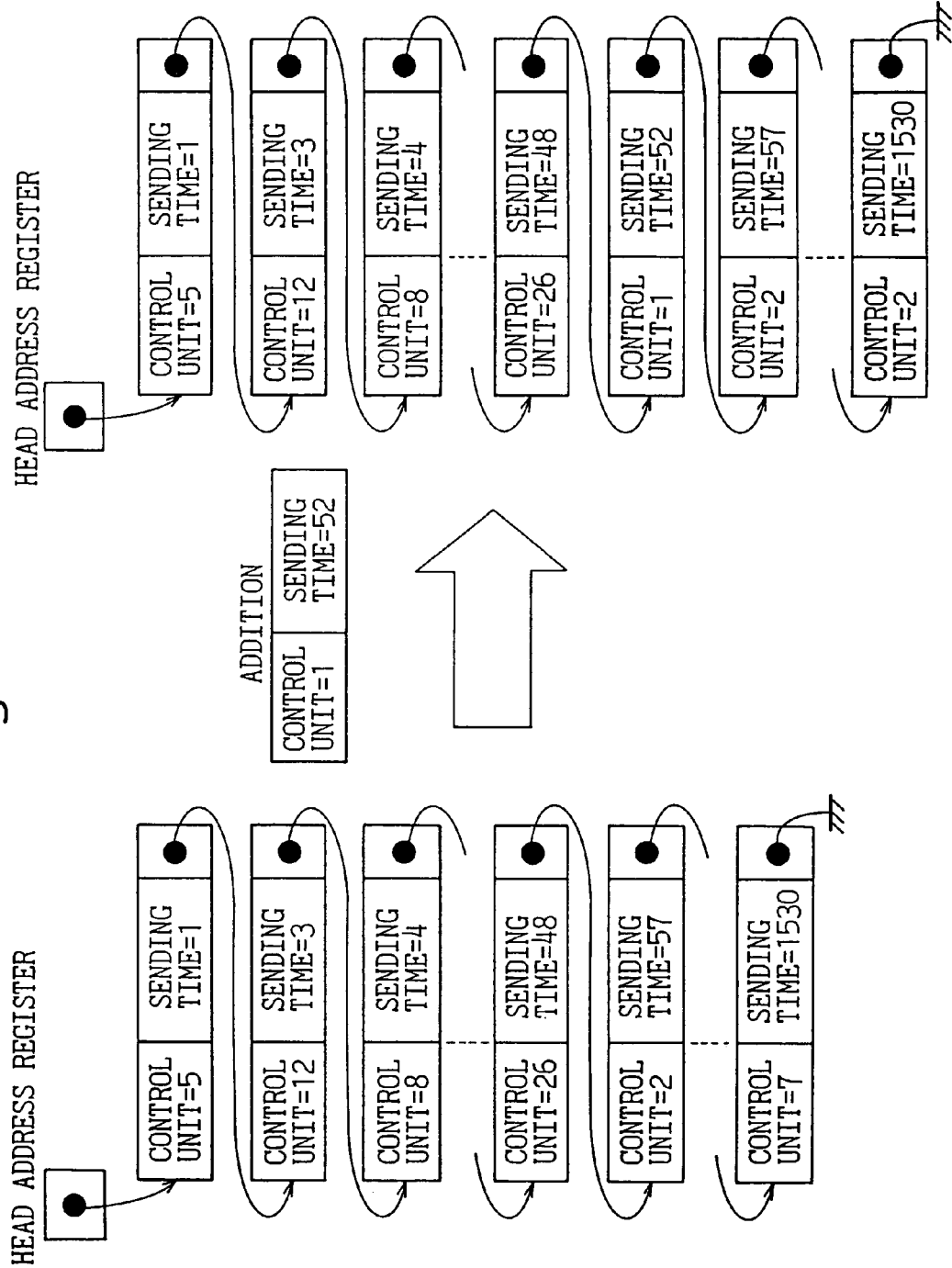
FIG. 15 is a view for explaining registration of pointer link information and adding processes in a pointer link memory in the sending order control unit in the first embodiment of the present invention.
Figure 16:
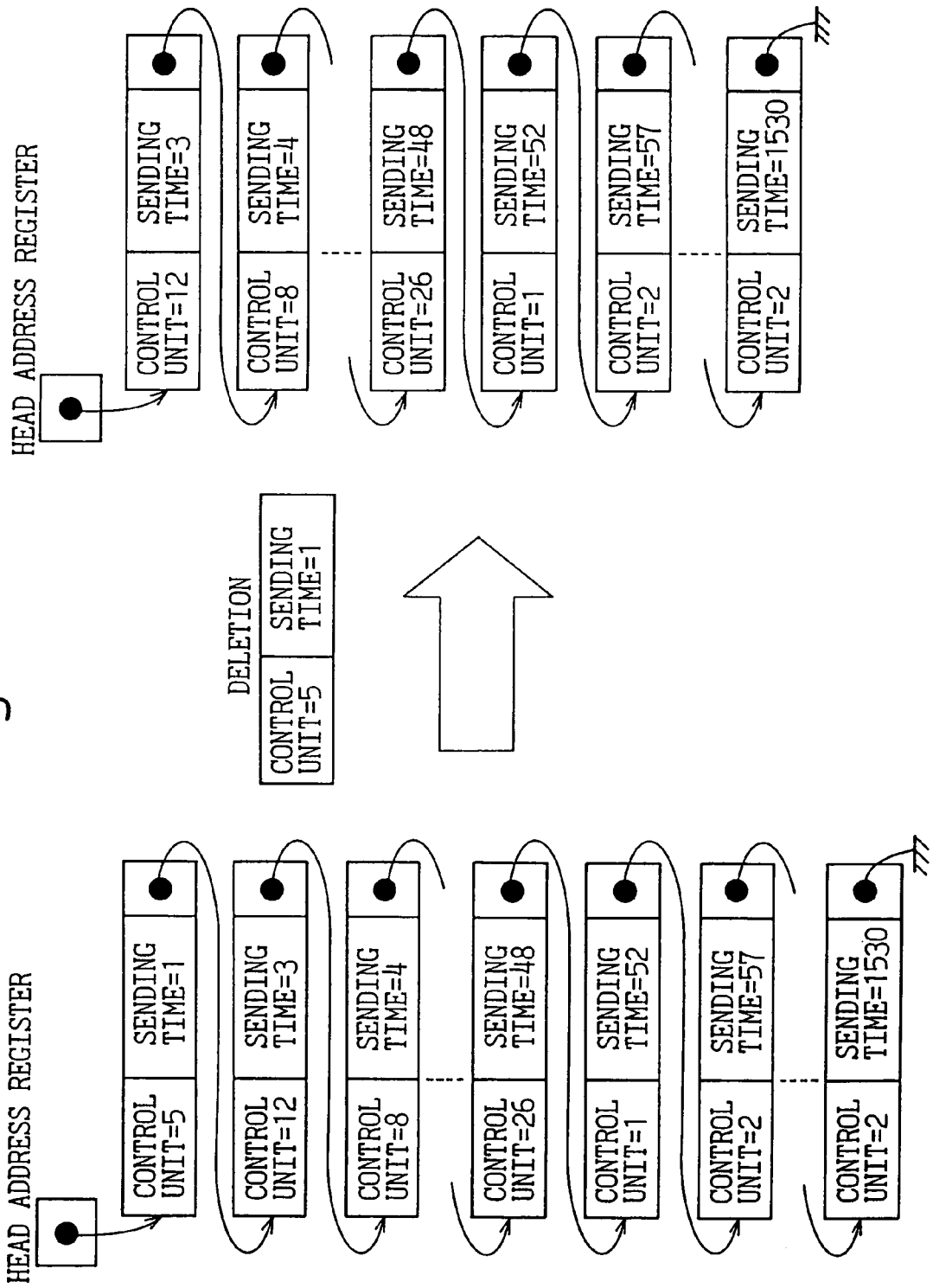
FIG. 16 is a view for explaining registration of pointer link information and erasing processes at the pointer link memory in the sending order control unit in the first embodiment of the present invention.
Figure 17:
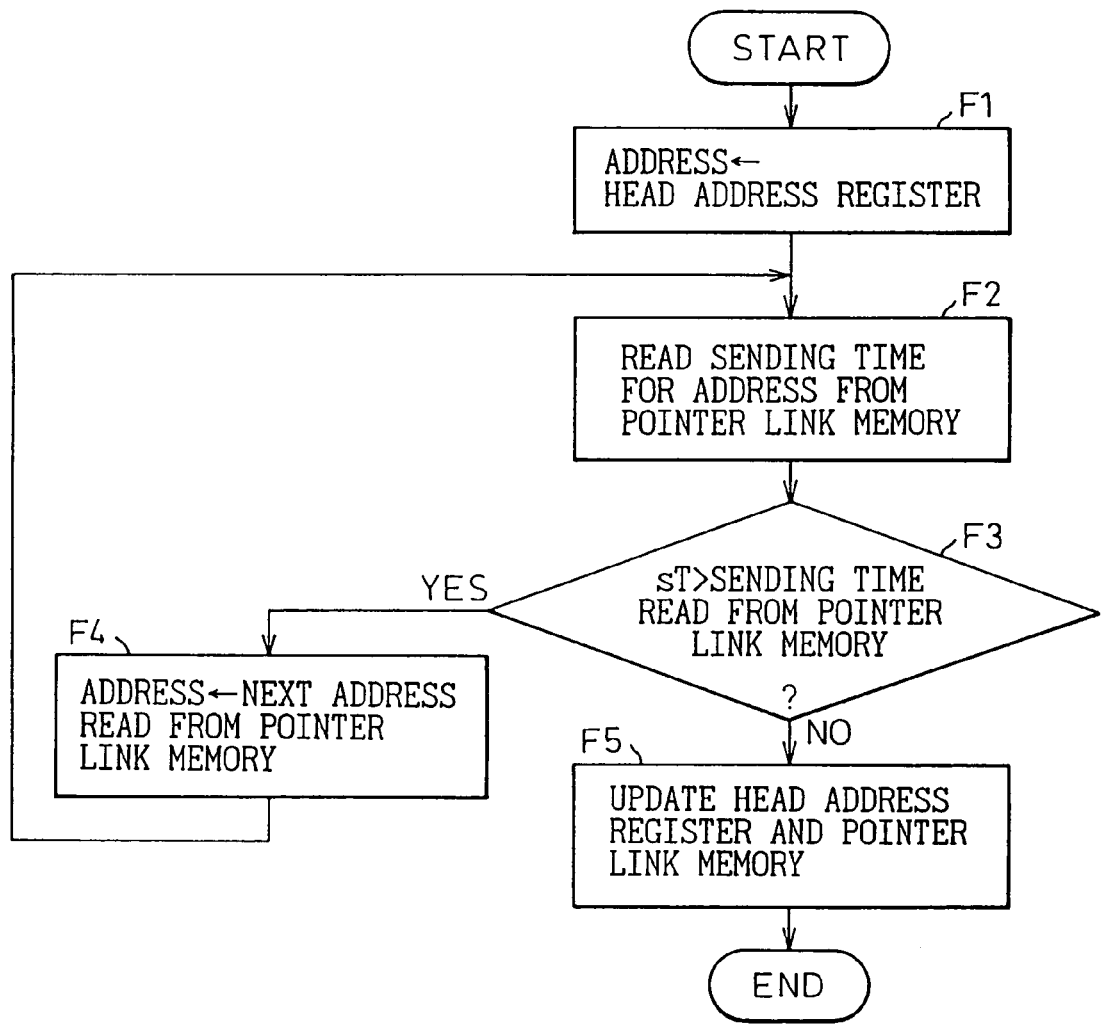
FIG. 17 is a flowchart for explaining registration of the sending time into the pointer link memory as the pointer link information in the first embodiment of the sending order management in the present invention.
Figure 18:
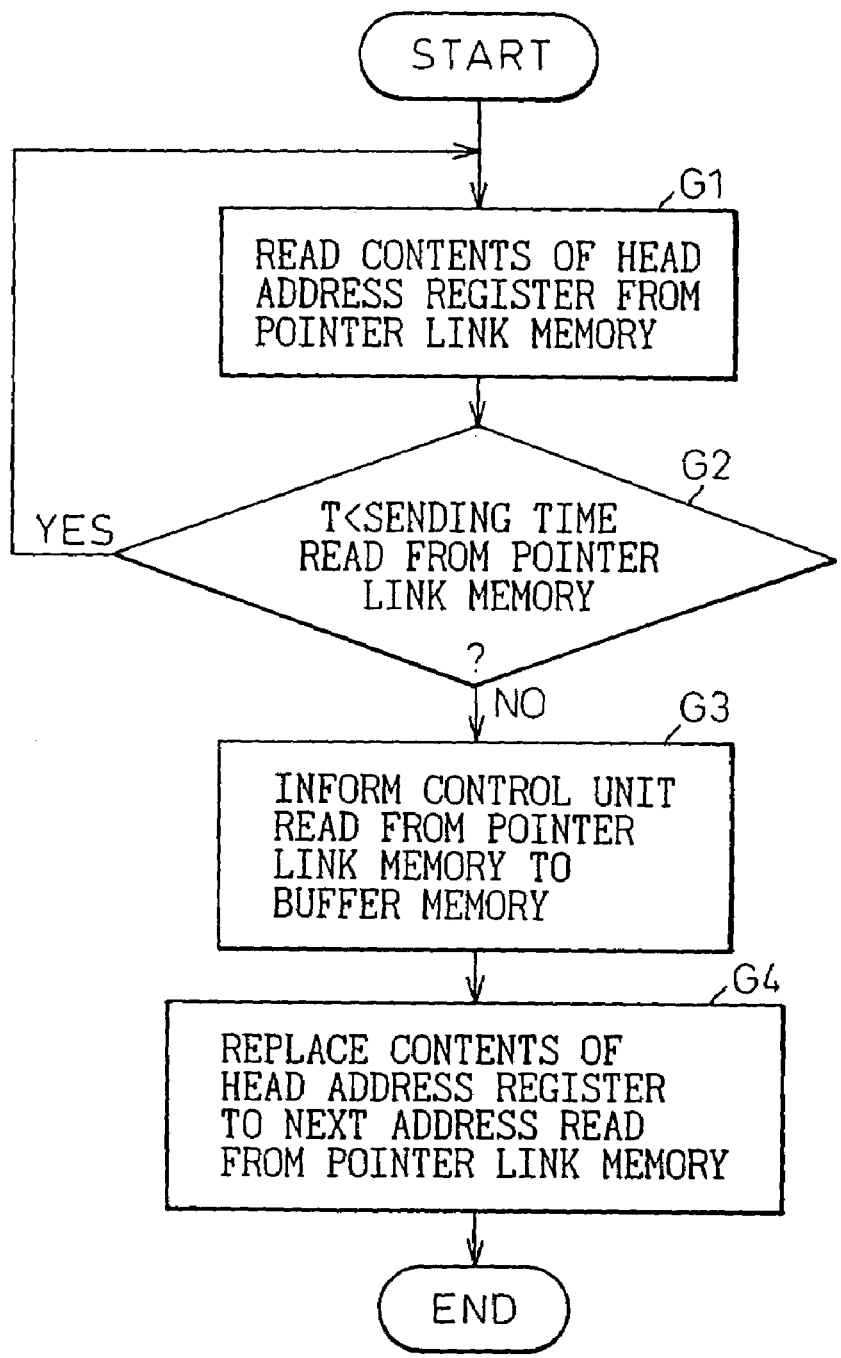
FIG. 18 is a flowchart for explaining read operation of the pointer link information from the pointer link memory in the first embodiment of the sending order management in the present invention.

As mentioned above, FIG. 14 is a detailed block diagram of the sending order control unit 3 in the packet flow control apparatus according to the present invention; FIG. 15 is view for explaining registration of pointer link information and additional processes in a pointer link memory 33 in the sending order control unit 3 in the embodiment (a); FIG. 16 is view for explaining registration of pointer link information and cancellation processes in the pointer link memory 33 in the sending order control unit 3 in the embodiment (a); FIG. 17 is a flowchart for explaining registration processes of the packet information including the sending time information from the sending time calculating unit 2 to the pointer link memory 33, as the pointer link information; and FIG. 18 is a flowchart for explaining read processes of the pointer link information read from the pointer link memory 33.

As shown in FIG. 14, the sending order control unit 3 includes a pointer link control unit 31, a head address register 32 and the pointer link memory 33. The pointer link memory 33 stores the information of the control unit, and the information of the pointer link information including the sending time corresponding to the control unit, the address of the packet to be sent at the next time and the additional information. Further, in the pointer link memory 33, it may be possible to utilize the information of the packet or the information of the read control in the buffer memory as the address information. Further, it may be possible to manage dynamically vacant areas of the memory and to assign the vacant areas with the information sent from the sending time calculating unit 2.

As shown in FIG. 15, on the pointer link memory 33, the pointer link information, which consist of the packet information existing in the buffer memory 1 and the information of the control unit belonging to the packet, are previously sorted in the form of pointer link based on the order of the sending time. Further, the head address register 32 stores a pointer that indicates the address of the pointer link information of the smallest sending time.

When the sending time sT sent from the sending time calculating unit 2 is transmitted as the packet information, the pointer link information in the pointer link memory 33 is added to the packet information, and the pointer link is updated in accordance with the steps shown in FIG. 15.

The pointer of the head address register 32 sequentially traces the pointer link information of the next address, in order, from the pointer link information at the smallest sending time. The sending time written in the pointer link information is compared with the packet sending time sT received from the sending time calculating unit 2 (steps F2 to F4 in FIG. 17). When the former is larger than the latter (step F3), the packet information at the sending time sent from the sending time calculating unit 2 is stored in the pointer link memory 33 as the pointer link information. Further, the pointers, after that pointer link information, are replaced with the next address in such a manner that other pointer link information are sorted in order of the time (step F5).

Further, when reading out the pointer link information, the pointer link information of the smallest sending time indicating the address of the pointer of the head address register 32 is read out from the pointer link memory 33 (step G1), and the sending time of the pointer link information is compared with the present time T of the clock 4 (step G2). When the sending time is equal to, or larger than the present time T, the read instruction (including the control unit information) for the packet corresponding to the pointer link information is sent to the buffer memory 1 (step G3), the corresponding packet is read out from the buffer memory 1, and the pointer of the head address register 32 is updated to the pointer value indicating the address of the pointer link information to be read next from the pointer link memory 33 (step G4).

Further, in the pointer link memory 33, the pointer link information are deleted in the pointer link memory 33, and the linked state is updated in accordance with the steps shown in FIG. 16.

(An embodiment (b) for managing the sending order)

Next, the management of the sending order in the sending order control unit 2 is explained in detail below.

In the above embodiment (a) for managing the sending order, the sending time of the new packet is calculated in the sending time calculating unit 2, and is sent to the sending order control unit 3. Further, the pointer link information is read out from the sending order control unit 3, and when the read instruction of the packet is sent to the buffer memory 1, the pointer link information in the pointer link memory 33 of the sending order control unit 3 are added or deleted so that the state of the pointer link is changed. In this case, it is necessary to update collectively the contents of the pointer link information that are provided after the pointer link information newly added or deleted. In these processes, however, when there is much pointer link information after adding or deleting pointer link information, a working amount is considerably increased. Accordingly, the embodiment (b) is provided in order to resolve the above problems.

Figure 19:
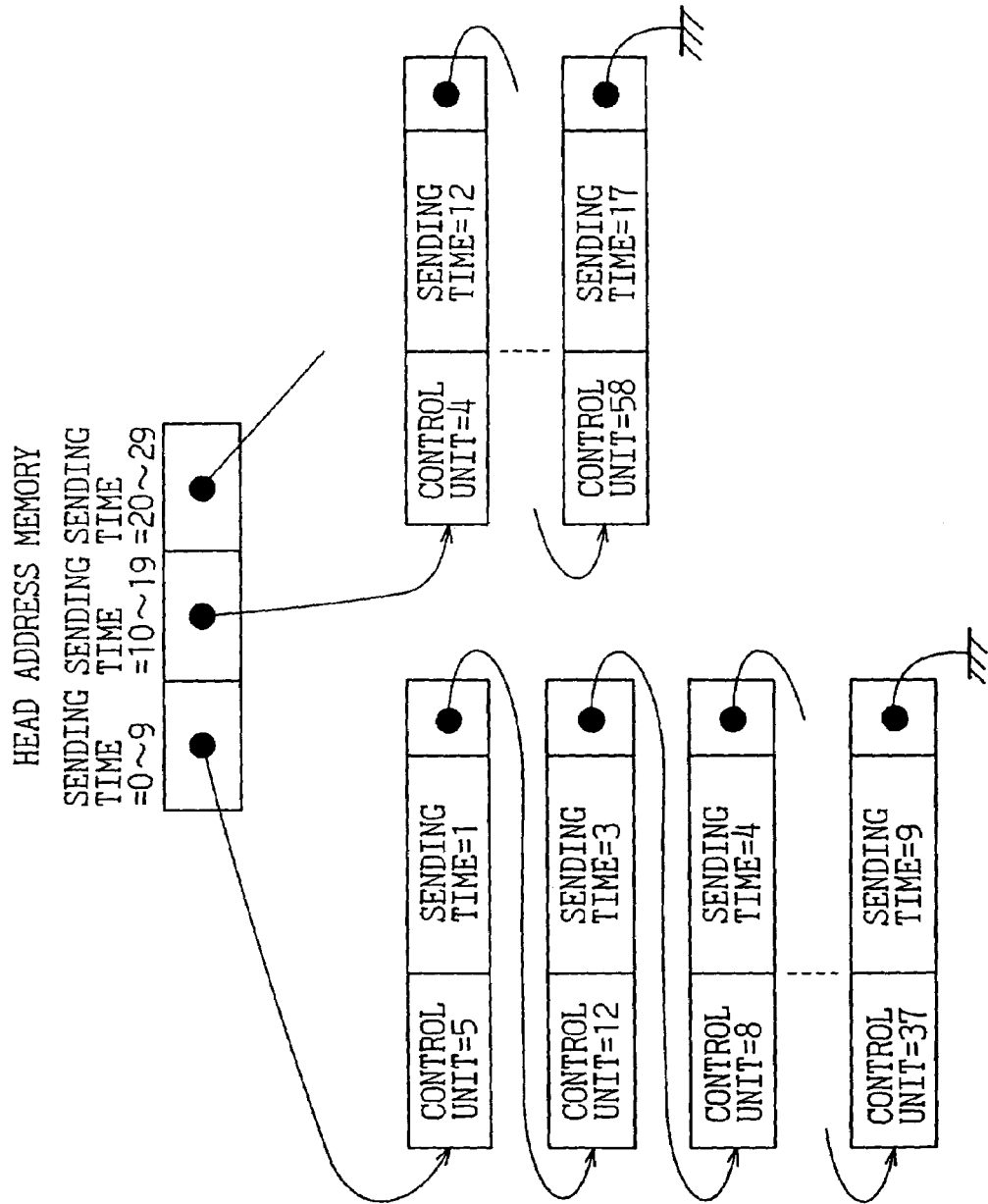
FIG. 19 is a view for explaining a state of link of the pointer link in the pointer link memory in the second embodiment of the sending order management in the present invention.

FIG. 19 is a view for explaining the state of link of the pointer link information in the pointer link memory 33 in the embodiment (b). As shown in the drawing, the head address register 32 is formed in order to manage three pointers. In this case, a first pointer is assigned for the sending time sT of 0 to 9, a second pointer is assigned for the sending time sT of 10 to 19, and a third pointer is assigned for the sending time sT of 20 to 29, as trains of the pointer link information. Further, each of these pointer link information corresponds to the address of the pointer link information at the head. The head address register 32 manages the address of the head pointer link information in the three trains of the pointer link information in the pointer link memory 33 for each unit time (for example, 1 milli-sec), and updates the content.

As well as the embodiment (a), the three trains of the pointer link information in the pointer link memory 33 are previously sorted in the form of the pointer link based on the order of the sending time, in connection with the packet information (the packet information or the control unit information belonging to the above packets) existing in the buffer memory 1, based on the head pointer link information indicating the address of each pointer in the head address register 32.

The three trains of the pointer link information in the pointer link memory 33 are changed in such a manner that, first, the pointer link information are read out sequentially from the first train of the pointer link information having early sending time and, when all pointer link information are read out from the first train, the pointer link information are read out sequentially from the second train of the pointer link information having the next earliest sending time. Further, the train of the pointer link information, in which all pointer link information are read out, is used as the train of the pointer link information for sorting the latest pointer link information of the sending time. As mentioned above, three trains of the pointer link information are sequentially changed in order to perform addition or deletion of the pointer link information.

Based on the above structure, even if there are addition or deletion of the pointer link information for the pointer link memory 33, only the pointer link information in the train of the pointer link information is sorted in the range of the train of the pointer link information belonging to the pointer link information to be added or deleted, so that it is possible to reduce the working amount in the update processes of the contents.

(An embodiment (c) for managing the sending order)

The embodiment (c) is provided for improving the embodiment (b). That is, in the embodiment (b), in order to register the pointer link information having the latest sending time into the train of the pointer link information, it is necessary to previously prepare the trains of the pointer link information from the earliest sending time until the latest sending time. Accordingly, in order to resolve the above problem, it is necessary to either increase the number of the train of the pointer link information, or increase the number of the pointer link information per one train. In this case, however, the use efficiency of the pointer link memory 33 is not economical. The embodiment (c) is provided for resolving the above problem of the embodiment (b).

Figure 20:
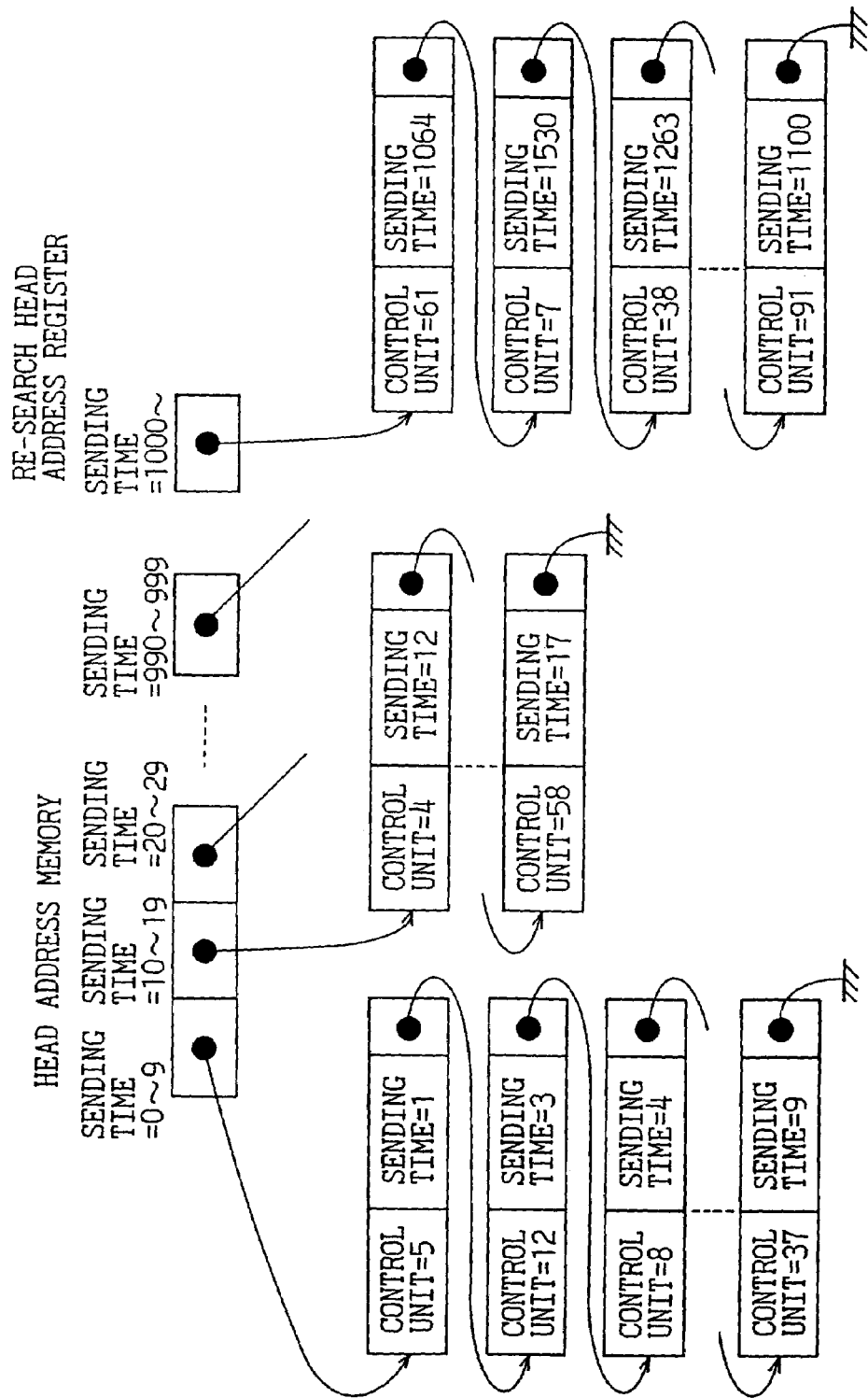
FIG. 20 is a view for explaining a state of link of the pointer link in the pointer link memory in the third embodiment of the sending order management in the present invention.

FIG. 20 is a view for explaining the state of the link of the pointer link information in the pointer link memory 33. As shown in the drawing, the head address register 32 is formed so as to manage the pointer of each head pointer link information in the trains in which the sending time is 0 to 9, 10 to 19, 20 to 29, . . . , 990 to 999. Further, a re-searching head address register is provided in addition to the head address register 32, and is formed so as to manage the pointers of the head pointer link information of the trains sorted by the sending time having the pointer link information of 1000 or more. That is, in the head address register 32, pointers (addresses) are prepared only from the present time until a certain time (in this example, sT=999). The pointers, after a certain time and which cannot be supported by the head address register 32, are managed by the re-searching head address register as the re-searching pointer.

In the sending time calculating unit 2, when the packet information including the sending time is sent, and when the sending time information lies in each address range (each section of pointer divided based on the sending time) which is managed by the head address register 32, the embodiment (c) is operated in the same manner as the embodiment (b). On the other hand, when the sending time information does not exist in the above address range, the pointer link information of the packet information including the sending time is added to the re-searching pointer link information indicated by the re-searching pointer of the re-searching head address register, so as to form the pointer link. In this case, the added pointer link information may be sorted in order of the time, or may be simply added to a vacant area without sorting in order of the time.

Further, the contents of the trains of the pointer link information, which are formed by the re-searching pointer indicated by the re-searching head address register, are read out for every constant time. When the sending time included in the address range of the head address register 32 is searched, the contents of the trains are sorted for the trains of the pointer link information belonging to the address, in accordance with the same steps as the packet information from the sending time calculating unit 2, and added to the pointer link.

Further, the re-searching pointer may be formed by a memory. In this case, the read operation from the memory may be performed for every constant time (for example, 1 milli-sec) from the contents of the memory having the smallest time with the contents of the pointer link memory 33.

The control at the read operation of the packet is omitted since it is the same as the embodiment (b).

(An embodiment (d) for managing the sending order)

Figure 21:
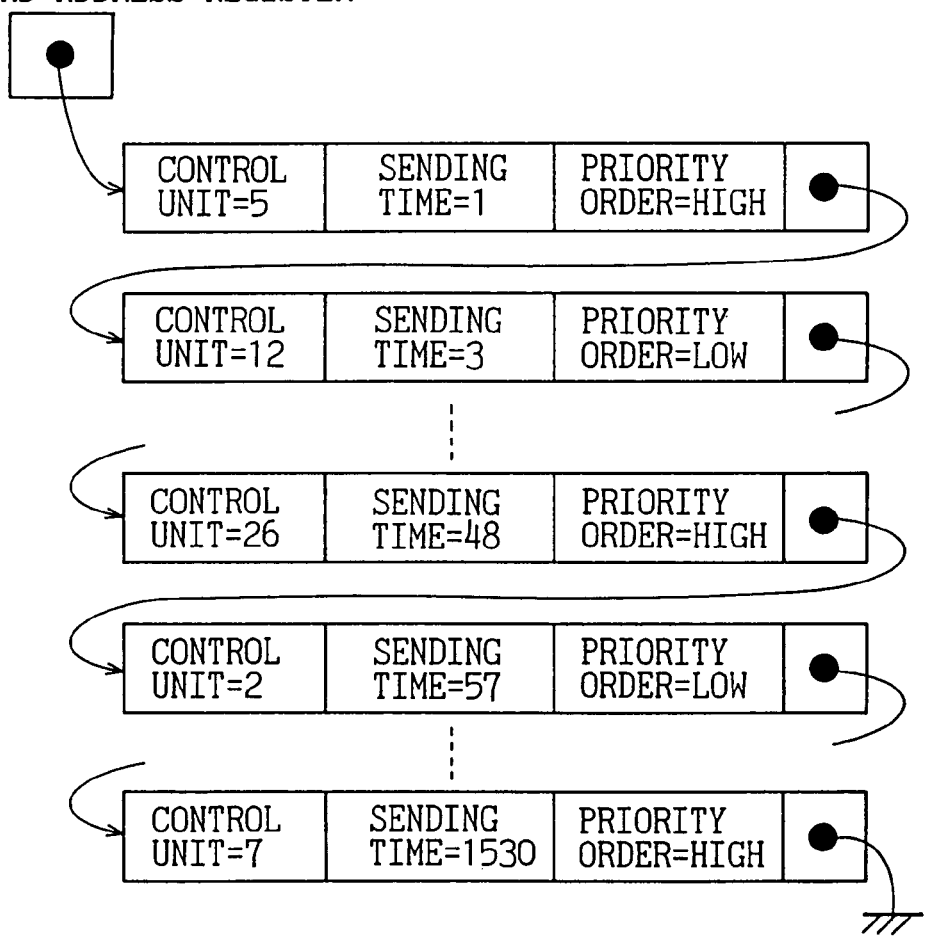
FIG. 21 is a view for explaining a state of link of the pointer link in the pointer link memory in the fourth embodiment of the sending order management in the present invention.

FIG. 21 is a view for explaining the state of the link of the pointer link information in the pointer link memory 33 in the embodiment (d).

As shown in the drawing, in the embodiment (d), the contents described in the embodiments (a) to (c) are added to the pointer link information linked to the pointer link memory 33, and priority information are stored as the additional information. The priority information are formed of "high" and "low". In this case, the packet of the priority "high" is preferentially read out and sent rather than the priority "low" when the "low" lies in a time zone (i.e., the sending time has a predetermined time zone) of the same sending time.

When the information are sent from the sending time calculating unit 2, with the contents in the embodiments (a) to (c), the priority information described in the packet header, or the priority information supposed by the contents of the header, or the priority information for each control unit of the sending, is sent from the sending time calculating unit 2. Further, when the packet is sorted in order of the sending time, and when the same packet in the time zone was already stored in the pointer link memory 33 as the pointer link information, the pointer link information of the packet having the priority "high" is sorted so as to be positioned prior to the pointer link information of the packet having the priority "low", in accordance with the priority information.

The detailed explanations of the following operation in the embodiment (d) are omitted since they are the same operations as the embodiments (a) to (c).

(An embodiment (e) for managing the sending order)

Figure 22:
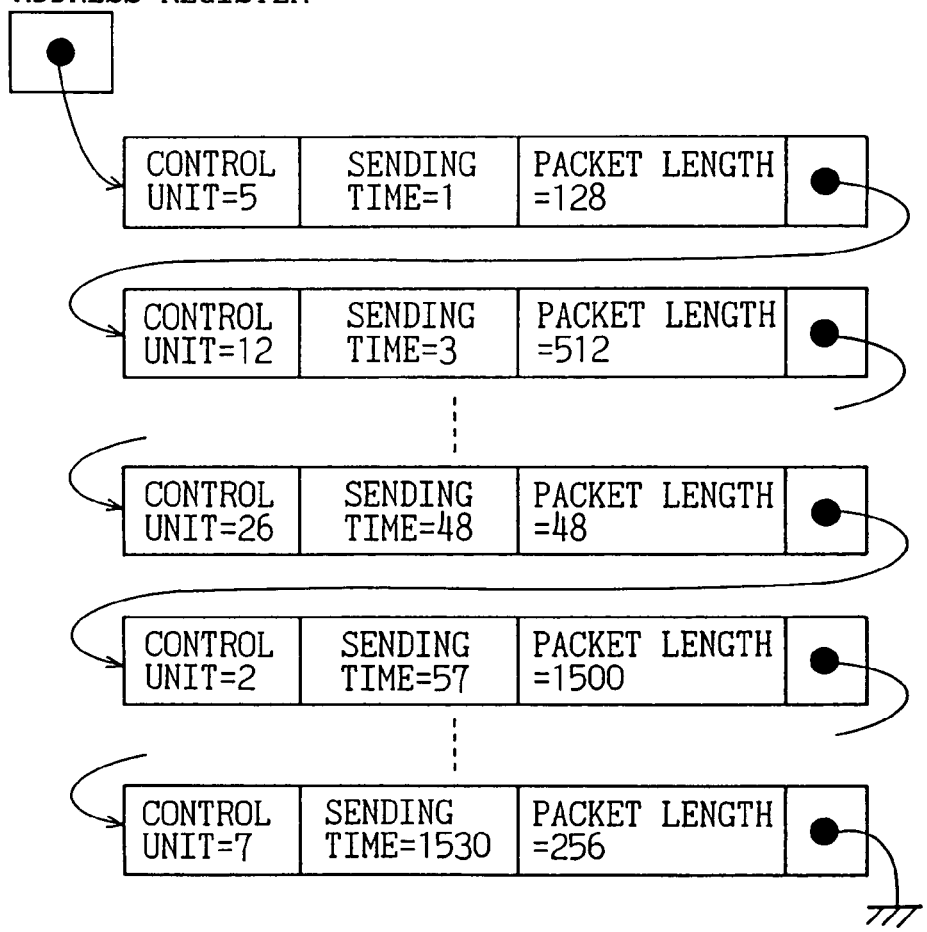
FIG. 22 is a view for explaining a state of link of the pointer link in the pointer link memory in the fifth embodiment of the sending order management in the present invention.

FIG. 22 is a view for explaining the state of the link of the pointer link information in the pointer link memory 33 in the embodiment (e). As shown in the drawing, in the embodiment (e), the contents described in the embodiments (a) to (c) are added to the pointer link information linked to the pointer link memory 33, and the packet length is stored as the additional information.

When the information are sent from the sending time calculating unit 2, the information of the packet length are sent therefrom with the contents in the embodiments (a) to (c). Further, when the packet is sorted in order of the sending time, and when the same packet in the time zone was already stored in the pointer link memory 33, the packet having short packet length is set to the priority "high", and the pointer link information of the packet having the priority "high" is sorted so as to be positioned prior to the pointer link information of the packet having the priority "low", in accordance with the information of the packet length.

Briefly, the present invention has various effects as explained below.

First, it is not necessary to provide the token bucket counter for each control unit of the packet, and only memory is provided for storing parameters for each control unit.

Further, as the parameters used in the calculation of the sending time, as explained in the embodiments (1) and (4) for calculation of the sending time, when the recovery time is stored in the memory, it is possible to reduce the number of parameters to be stored in the memory, so that it is possible to reduce the memory capacity.

Still further, as explained in the embodiments (3) and (4) for calculation of the sending time, when the system is structured in such a manner that calculation of the sending time of the packet is performed at the time when the packet is read out from the buffer memory, it is not necessary to hold the sending time of the packet of the buffer memory in the sending order control unit. Accordingly, it is sufficient to store only next sending time for each control unit, so that it is possible to treat dynamically the change of the range.

Still further, as explained in the embodiment (5) for calculation of the sending time, when each parameter is normalized in such a manner that the addition rate of the counter becomes "1", it is possible to simplify a calculation circuit of the sending time.

Still further, as explained in the embodiment (a) for management of the sending order, it is possible to easily realize contention control by managing the sending order in the form of the pointer link.

Still further, as explained in the embodiment (b) for management of the sending order, it is possible to reduce times of comparing steps used for sorting by sorting and managing the sending order in a plurality of time zones.

Still further, as explained in the embodiment (c) for management of the sending order, when the system is structured in such a manner that the packets having the sending time larger than a predetermined value are temporarily stored separately from the memory for sorting, so that it is possible to reduce the memory capacity.

Still further, as explained in the embodiment (d) for management of the sending order, it is possible to weaken the influence of contention for the packet required for high-quality by structuring the system so as to provide the priority order to the link information of the packet to be sorted.

Still further, as explained in the embodiment (e) for management of the sending order, it is possible to weaken the fluctuation of delay at the contention, by structuring the system so as to attach the packet length information to the link information of the packet to be stored, and to preferentially handle the short packet length.

What is claimed is:

1. A packet flow control apparatus performing flow control of packets each having variable length, comprising:
   a buffer memory for temporarily accumulating arrived packets until a sending time for each packet;
   a counter updated based on the length of an input packet and a rate determined by a limited flow of packets;
   a sending time determining means for determining the sending time of each packet based on the counter value and a present time; and
   a sending order control means for managing a sending order of each packet accumulated in the buffer memory, and for sending a read instruction of each packet to the buffer memory, based on the sending time determined by the sending time determining means;
   wherein the sending time determining means includes a memory means storing parameters for each of a plurality of control units to independently control packet flow, the parameters determining a state of change of the counter; when an input packet is written into the buffer memory, the sending time determining means obtains the sending time of the input packet based on the parameters read out from the memory means, the parameters corresponding to the control unit controlling the input packet; and the sending time determining means updates the parameters based on a newly obtained sending time of the input packet, and transfers the newly obtained sending time of the input packet to the sending order control means.

2. A packet flow control apparatus performing flow control of packets each having variable length comprising:
   a buffer memory for temporarily accumulating arrived packets until a sending time for each packet;
   a counter updated based on the length of an input packet and a rate determined by a limited flow of packets;
   a sending time determining means for determining the sending time of each packet based on the counter value and a present time; and
   a sending order control means for managing a sending order of each packet accumulated in the buffer memory, and for sending a read instruction of each packet to the buffer memory, based on the sending time determined by the sending time determining means;
   wherein the sending time determining means includes a memory means storing parameters for each of a plurality of control units to independently control the packet flow, the parameters determining a state of change of the counter and including a sending time of a pre-packet belonging to the control unit and a counter value at the sending time; when an input packet is written into the buffer memory, the sending time determining means obtains the sending time of the input packet and the counter value at the sending time, based on the parameters having the same control unit as the input packet read out from the memory means; and the sending time determining means updates the parameters having the same control unit in the memory means based on a newly obtained sending time of the input packet and the counter value at the sending time, and transfers the newly obtained sending time of the input packet to the sending order control means.

3. A packet flow control apparatus performing flow control of packets each having variable length, comprising:
   a buffer memory for temporarily accumulating arrived packets until a sending time for each packet;
   a counter updated based on the length of an input packet and a rate determined by a limited flow of packets;
   a sending time determining means for determining the sending time of each packet based on the counter value and a present time; and
   a sending order control means for managing a sending order of each packet accumulated in the buffer memory, and for sending a read instruction of each packet to the buffer memory, based on the sending time determined by the sending time determining means;
   wherein the sending time determining means includes a memory means storing parameters for each of a plurality of control units to independently control the packet flow, the parameters determining a state of change of the counter and including a recovery time to return the counter value at the sending time of a pre-packet belonging to the control unit, to a limit value; when an input packet is written into the buffer memory, the sending time determining means obtains the sending time of the input packet and the recovery time to return the counter value at the sending time to the limit value, based on the parameters read out from the memory means; and the sending time determining means updates the parameters having the same control unit in the memory means based on a newly obtained recovery time of the input packet, and transfers the newly obtained recovery time of the input packet to the sending order control means.

4. A packet flow control apparatus performing flow control of packets each having variable length, comprising:
   a buffer memory for temporarily accumulating arrived packets until a sending time for each packet;
   a counter updated based on the length of an input packet and a rate determined by a limited flow of packets;
   a sending time determining means for determining the sending time of each packet based on the counter value and a present time; and
   a sending order control means for managing a sending order of each packet accumulated in the buffer memory, and for sending a read instruction of each packet to the buffer memory, based on the sending time determined by the sending time determining means;
   wherein the sending time determining means includes a memory means storing parameters which can determine a state of change of the counter value of the counter means for each of a plurality of control units to independently control packet flow, the parameters determining a state of change of the counter; when a packet to be sent is read out from the buffer memory, the sending time determining means obtains the sending time of a next packet to be sent after next time within packets belonging to the control unit of the sending packets in the buffer memory, based on the parameter having the same control unit as the sending packet read out from the memory means; and the sending time determining means updates the parameters having the same control unit in the memory means based on a newly obtained sending time of a next packet, and transfers the newly obtained sending time of the next packet to the sending order control means.

5. A packet flow control apparatus performing flow control of packets each having variable length, as claimed in claim 4, wherein, when there are no packets belonging to the control unit in the buffer memory for the control unit of the input packets, the sending time determining means determines the sending time of the input packet when the input packet is written into the buffer memory, and transfers the sending time to the sending order control means, and updates the parameters in the memory means based on the sending time.

6. A packet flow control apparatus performing flow control of packets each having variable length, comprising:

a buffer memory for temporarily accumulating arrived packets until a sending time for each packet;

a counter updated based on the length of an input packet and a rate determined by a limited flow of packets;

a sending time determining means for determining the sending time of each packet based on the counter value and a present time; and a sending order control means for managing a sending order of each packet accumulated in the buffer memory, and for sending a read instruction of each packet to the buffer memory, based on the sending time determined by the sending time determining means;

wherein the sending time determining means includes a memory means storing parameters for each of a plurality of control units to independently control the packet flow, the parameters determining a state of change of the counter and including a sending time of a packet belonging to the control unit and a counter value at the sending time; when a packet to be sent is read out from the buffer memory, the sending time determining means obtains the sending time of a next packet to be sent after next time within packets belonging to the control unit of the sending packets in the buffer memory and a counter value at the sending time, based on the parameter having the same control unit as the sending packet read out from the memory means; and the sending time determining means updates the parameters having the same control unit in the memory means based on a newly obtained sending time of a next packet and the counter value at the sending time, and transfers the newly obtained sending time of the next packet to the sending order control means.

7. A packet flow control apparatus performing flow control of packets each having variable length, as claimed in claim 6, wherein, when there are no packets belonging to the control unit in the buffer memory for the control unit of the input packets, the sending time determining means determines the sending time of the input packet when the input packet is written into the buffer memory, and transfers the sending time to the sending order control means, and updates the parameters in the memory means based on the sending time.

8. A packet flow control apparatus performing flow control of packets each having variable length, comprising:

a buffer memory for temporarily accumulating arrived packets until a sending time for each packet;

a counter updated based on the length of an input packet and a rate determined by a limited flow of packets;

a sending time determining means for determining the sending time of each packet based on the counter value and a present time; and a sending order control means for managing a sending order of each packet accumulated in the buffer memory, and for sending a read instruction of each packet to the buffer memory, based on the sending time determined by the sending time determining means;

wherein the sending time determining means includes a memory means storing parameters for each of a plurality of control units to independently control the packet flow, the parameters determining a state of change of the counter and including a recovery time to return the counter value at the sending time of a packet belonging to the control unit to a limit value; when a packet to be sent is read out from the buffer memory, the sending time determining means obtains the sending time of a next packet to be sent after next time within packets belonging to the control unit of the sending packets in the buffer memory and the recovery time to return a limit value to a counter value at the sending time, based on the parameter having the same control unit as the sending packet read out from the memory means; and the sending time determining means updates the parameters having the same control unit in the memory means based on a newly obtained recovery time of a next packet, and transfers the newly obtained recovery time of the next packet to the sending order control means.

9. A packet flow control apparatus performing flow control of packets each having variable length, as claimed in claim 8, wherein, when there are no packets belonging to the control unit in the buffer memory for the control unit of the input packets, the sending time determining means determines the sending time of the input packet when the input packet is written into the buffer memory, and transfers the sending time to the sending order control means, and updates the parameters in the memory means based on the sending time.

10. A packet flow control apparatus performing flow control of packets each having variable length, as claimed in any one of claims 1 to 9, wherein the parameters in the memory means are normalized based on a limited flow value, so as to set an update rate of the counter means to "1".

11. A packet flow control apparatus performing flow control of packets each having variable length, as claimed in any one of claims 1 to 9, wherein the sending order control means previously sorts the sending order of the packets accumulated in the buffer memory, based on the sending time information of the packets received from the sending time determining means, into a sorting memory, and performs the read instruction to the buffer memory by searching the packets to be sent at the next time.

12. A packet flow control apparatus performing flow control of packets each having variable length, as claimed in any one of claims 1 to 9, wherein the sending order control means previously sorts the sending order of the packets accumulated in the buffer memory by dividing a plurality of time zones, based on the sending time information of the packets received from the sending time determining means for each divided time zone, into the sorting memory, and performs the read instruction to the buffer memory by searching the packets to be sent at the next time.

13. A packet flow control apparatus performing flow control of packets each having variable length, as claimed in any one of claims 1 to 9, wherein, when the sending time determined by the sending order determining means is large, the sending order control means temporarily stores the sending time to another memory different from the sorting memory, and sorts the sending time into the sorting memory before the sending time.

14. A packet flow control apparatus performing flow control of packets each having variable length, as claimed in any one of claims 1 to 9, wherein a priority order of each packet is added to each sorted information accumulated in the sorting memory of the sending order control means, and, when there are a plurality of packets to be sent at the same sending time zone, the packet having a high priority order is preferentially sent from the sorting memory.

15. A packet flow control apparatus performing flow control of packets each having variable length, as claimed in any one of claims 1 to 9, wherein a packet length of each packet is added to each sorted information accumulated in the sorting memory of the sending order control means, and, when there are a plurality of packets to be sent at the same sending time zone, the packet having a shorter packet length is preferentially sent from the sorting memory.

* * * * *